United States Patent [19]

Hammer et al.

[11] 4,345,162

[45] Aug. 17, 1982

[54] METHOD AND APPARATUS FOR POWER LOAD SHEDDING

[75] Inventors: Jeffrey M. Hammer, St. Louis Park; Thomas J. Olson, Richfield, both of Minn.

[73] Assignee: Honeywell Inc., Minneapolis, Minn.

[21] Appl. No.: 164,711

[22] Filed: Jun. 30, 1980

[51] Int. Cl.³ .............................................. H02J 13/00
[52] U.S. Cl. ........................................ 307/39; 307/35; 364/493
[58] Field of Search ...................... 307/35, 38, 39, 40, 307/117, 126; 364/492, 493; 165/28

[56] References Cited

U.S. PATENT DOCUMENTS

| | | | |
|---|---|---|---|
| 3,359,551 | 12/1967 | Dennison | 340/310 |
| 3,834,617 | 9/1974 | Dyntar | 165/26 X |
| 3,925,680 | 12/1975 | Dixon | 307/39 |
| 3,933,197 | 1/1976 | Zimmer et al. | 165/2 |
| 4,001,557 | 1/1977 | Stephenson | 235/151.1 |
| 4,023,043 | 5/1977 | Stevenson | 307/38 |
| 4,174,064 | 11/1979 | Pratt, Jr. | 236/1 B |
| 4,228,364 | 10/1980 | Walden | 307/38 |

*Primary Examiner*—Gene Z. Rubinson
*Assistant Examiner*—James L. Dwyer
*Attorney, Agent, or Firm*—Charles G. Mersereau

[57] ABSTRACT

The present invention contemplates a method and apparatus for load-shedding duty cycling which overrides the normal thermostat control in a space conditioning system, upon receipt of an external signal as from the power company, in a manner such that the consumed power does not rise above the level that persisted just prior to the initialization signal. The present invention monitors the thermostat-controlled cycling pattern of a space conditioning system such as an air conditioner. Normally, the last thermostat-controlled cycle is then caused to become the reference or control cycle for the load shedding interval. That is, the ON portion of the reference cycle is caused to become the maximum allowable ON interval and the OFF portion of the reference cycle is caused to become the minimum OFF interval for the entire load shedding interval.

The device may be started by a single radio command or other means. The release from load control may be automatically timed or based on other signals. A radio receiver or other such means is provided to receive the signal from the power utility company which starts the load control function.

Unique features are also provided to prevent the undesirable effects of tampering with the thermostat setpoint just prior to the load shedding interval or to compensate for any cycle pattern of unusually long duration. This is done by compensating for the effect of these events by modifying the reference or control cycle when the appear.

46 Claims, 29 Drawing Figures

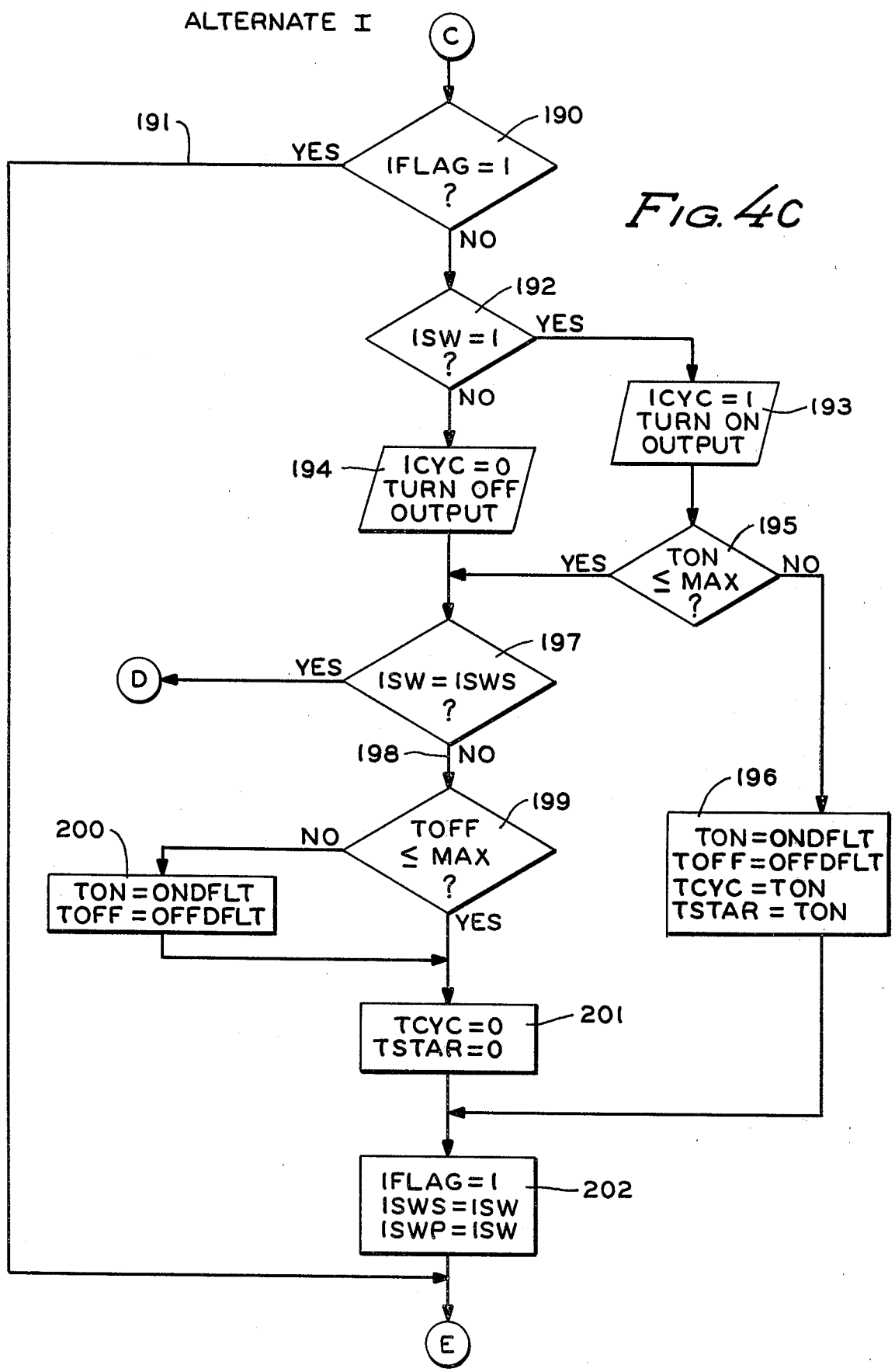

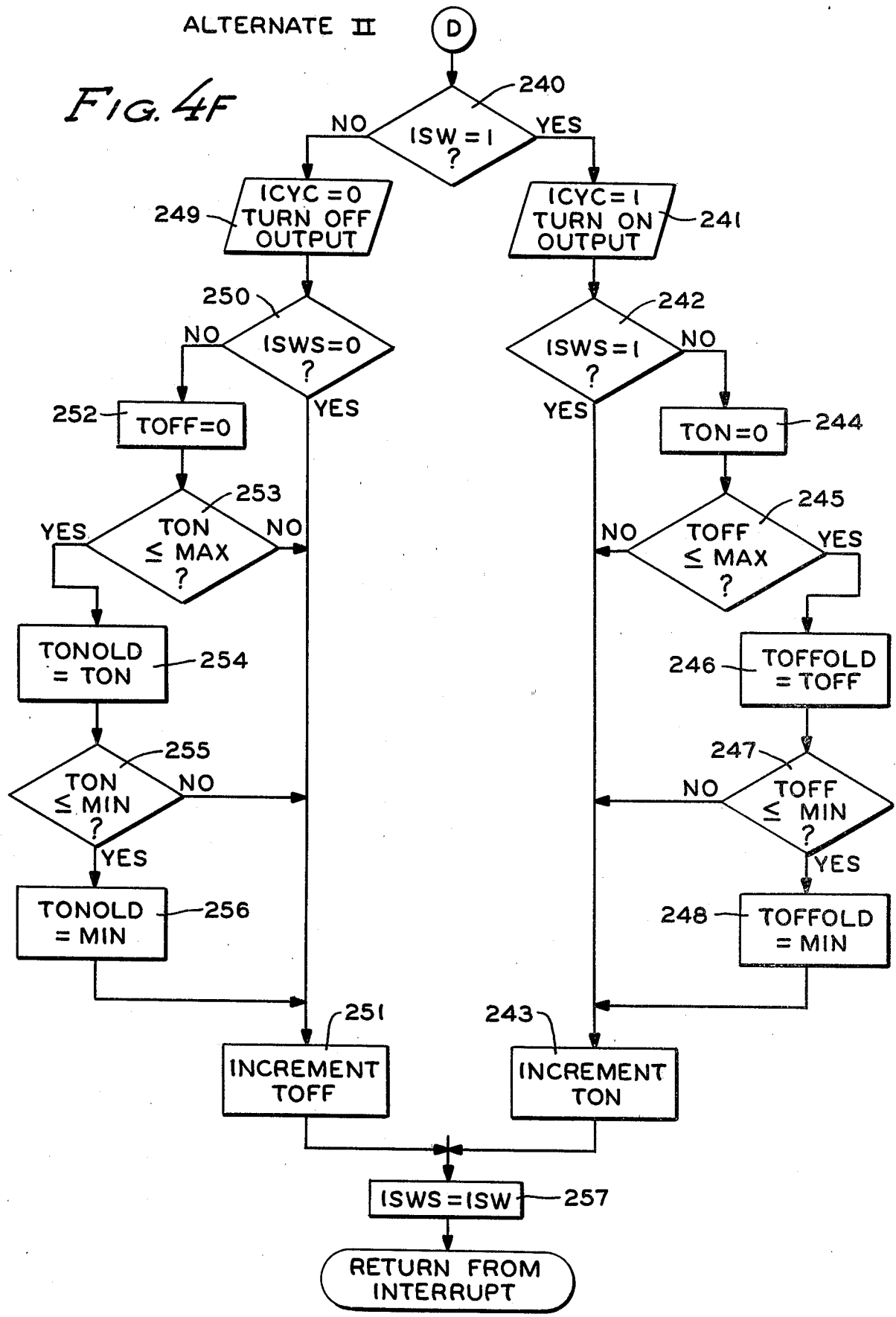

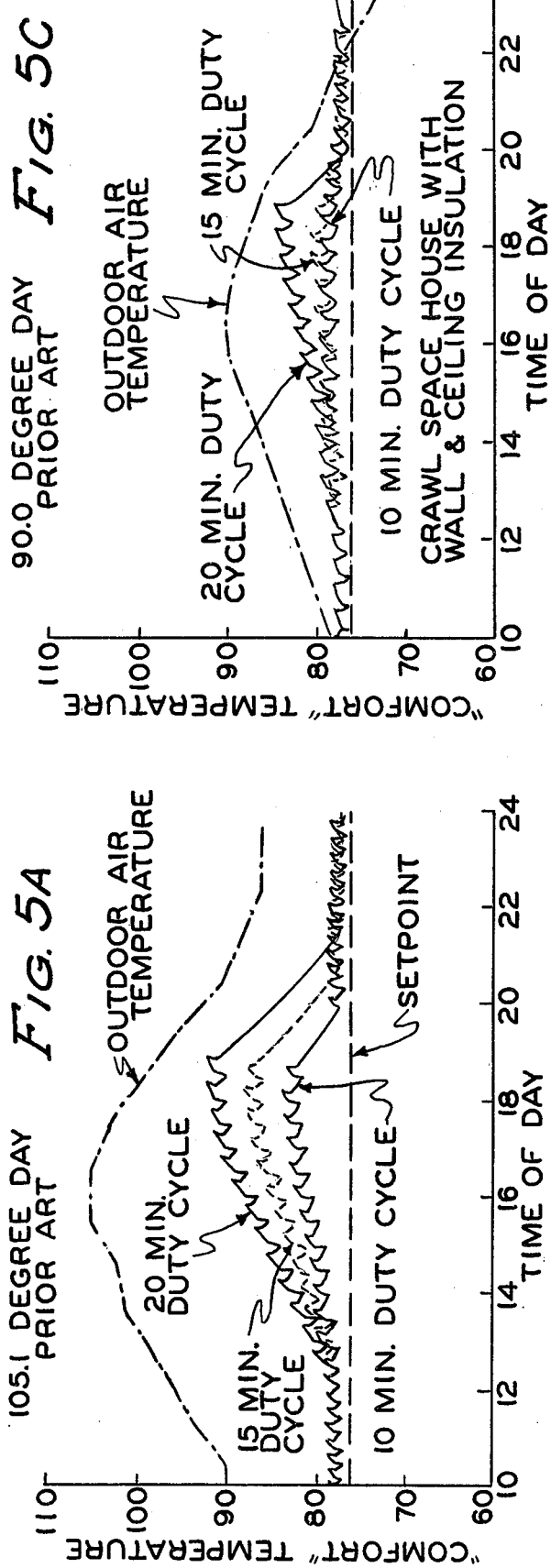
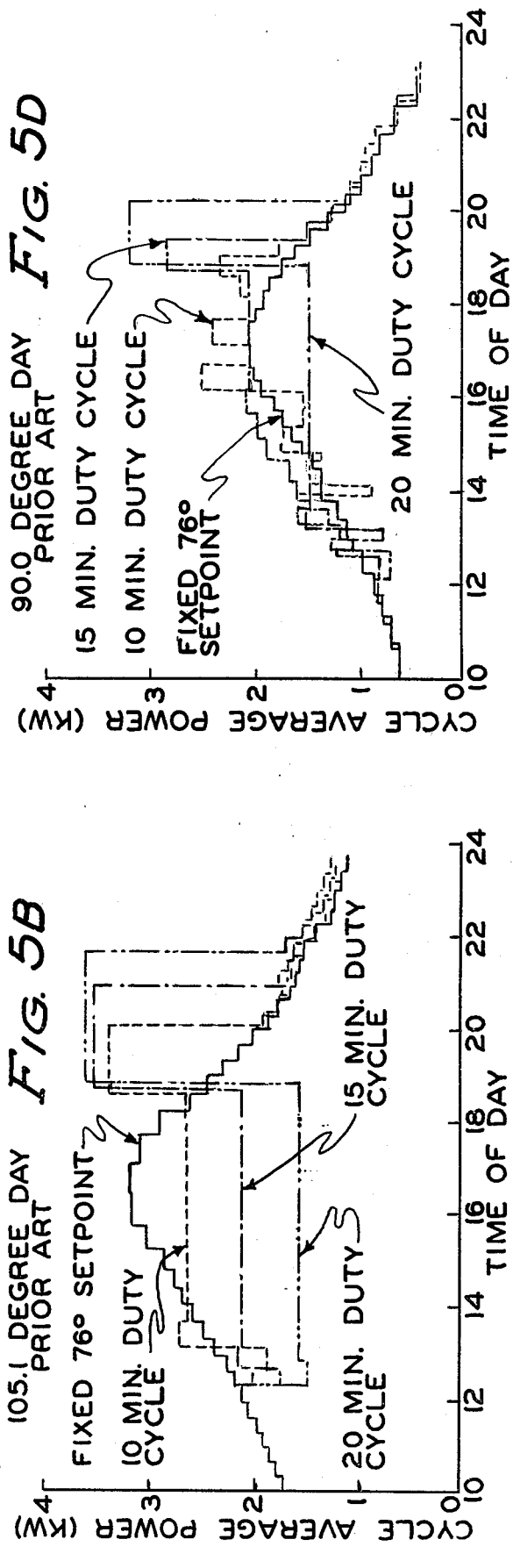

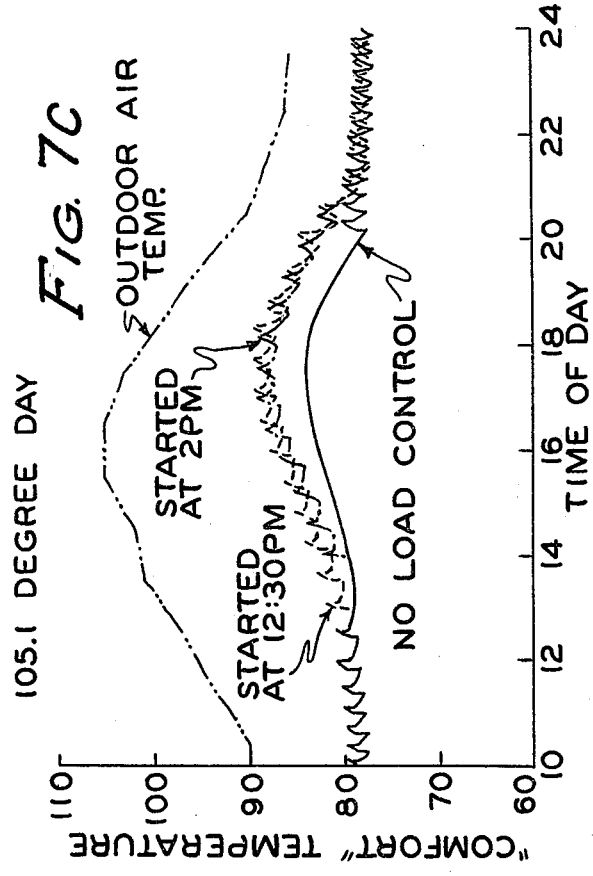
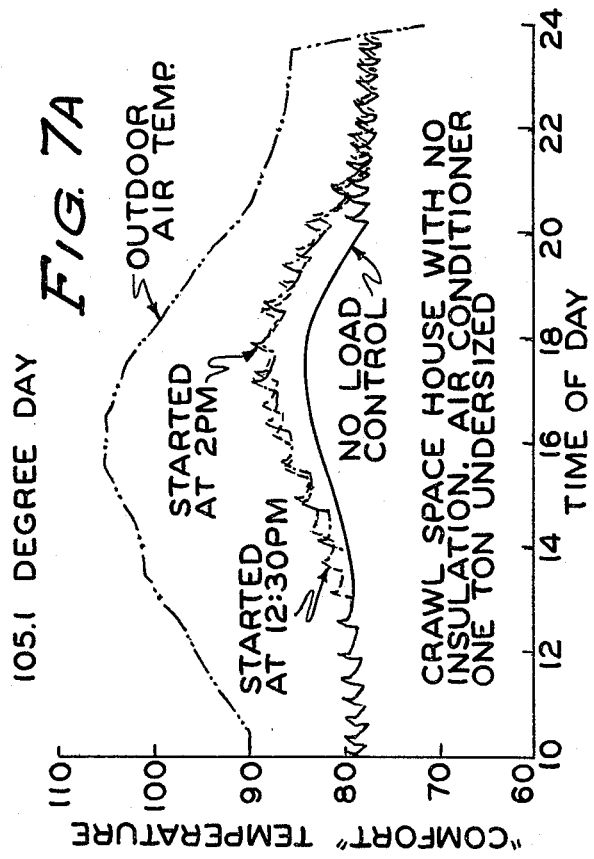
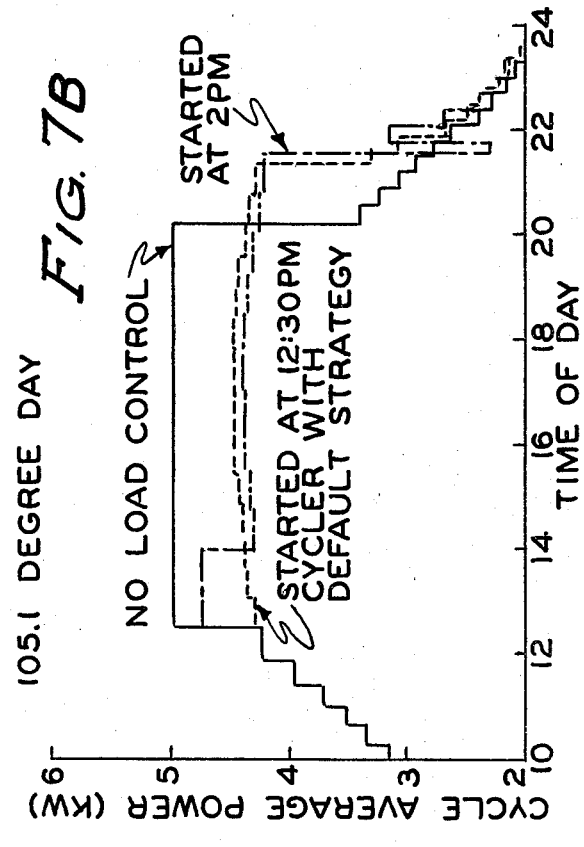

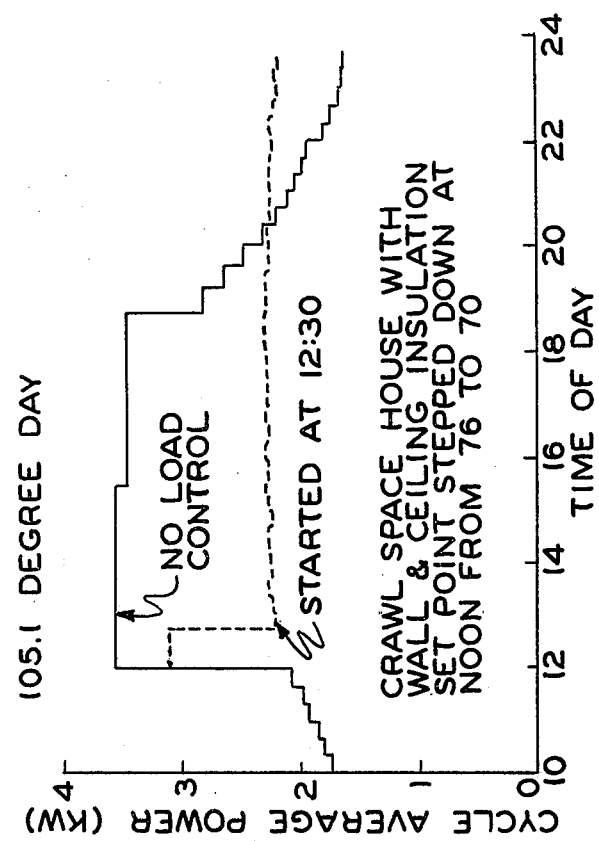
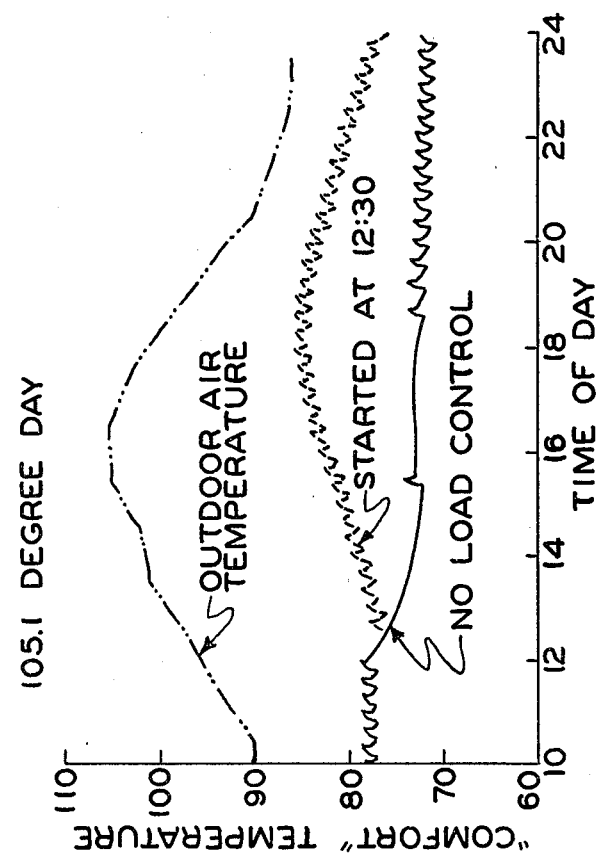

METHOD AND APPARATUS FOR POWER LOAD SHEDDING

BACKGROUND OF THE INVENTION

1. Field of the Invention

The present invention relates generally to a method of controlling the peak power demand in an electrical power distribution network by controlling the peak power consumption of individual loads such as air conditioning, or heating loads and, more particularly, to a method and apparatus for controlling the heating or cooling plants of individual space conditioning apparatus in a predetermined manner based on external commands.

2. Description of the Prior Art

One of the most serious problems confronting electric utility companies today is the great variance in total electrical demand on a network between peak and off-peak times during the day. The so-called peak demand periods or load shedding intervals are periods of very high demand on the power generating equipment where load shedding may be necessary to maintain proper service to the network. These occur, for example, during hot summer days occasioned by the widespread simultaneous usage of electric air conditioning devices. Typically the load shedding interval may last many hours and normally occurs during the hottest part of the day such as between the hours of noon and 6:00 p.m. Peaks may also occur during the coldest winter months in areas where the usage of electrical heating equipment is prevalent. In the past, in order to accommodate the very high peak demands, electric utility companies have been forced to spend tremendous amounts of money either in investing in additional power generating capacity and equipment or in buying so-called "peak" power from other utilities which have made such investments.

More recently, electric utility companies have turned to load shedding as a means of controlling peak demand and this has led to the use of the term "load shedding interval" to define the period in which the network load is controlled. It is desirable that a load shedding device limit power demand uniformly over the entire load shedding interval because the actual peak of power demand on the total utility grid could occur at any time during the load shedding interval.

In the prior art, several basic strategies and devices have been utilized for load shedding in order to limit the peak power demand on the power generating capacity of electric utility companies. One such mode involves sending signals either over the power lines or by utilizing a radio-type signal emanating from the utility to disconnect or interrupt the use of certain selected electric loads such as air conditioning compressors when the demand has reached a certain point. While this type of direct control of power consumption by the utility achieves usage cutbacks during peak periods which prevent the power network from becoming overloaded, in many cases, the great inconvenience to the user who may find his power disconnected for an inordinately long time may well outweigh the benefits of the load shedding.

An alternate method of control employed by utility companies to reduce peak power consumption on given networks involves the concept of duty cycling. This involves a time sharing over the network of certain amounts of the power during peak periods such that service is interrupted to selected devices on a time sharing basis. Thus, for example, on a ten minute per one-half hour duty cycle, all of the devices for which service is to be interrupt have their service interrupted ten minutes out of each one-half hour on a rotating basis which each ten minutes involving one-third of the device population. While this method of duty cycling does accomplish some load shedding, it has several disadvantages.

First, fixed-period duty cycling tends to destroy "natural diversity." Natural diversity may be illustrated in terms of many machines supplied by a common power network. A large group of air conditioning or heating machines which continually cycle ON and OFF to maintain comfort conditions in corresponding spaces have a natural tendency to operate such that the cycling pattern of each machine is in random phase with the cycling pattern of all other such machines in the power network. In this fashion, there is but a random likelihood that all of the air conditioning compressors or heating machines will be operating at the same instant. The tendency for this random operation is then called natural diversity. Any load shedding strategy which tends to synchronize the running periods of all the compressors or heaters in the utility service network reduces natural diversity. Synchronization causes significant spikes in power demand during the ON cycle of these devices and negates much of the benefits of the load shedding. If the devices to be interrupted are electric air conditioning and cooling units, for example, the chances are that all such units whose power supply has been interrupted will be calling for power at the end of the OFF cycle such that a spike in power demand will occur upon switching of the interrupted units at the end of each cycle.

Also, this method of load shedding may be defeated or overcome by the customer by the installation of an oversized air conditioning or heating unit such that it may maintain the temperature of the environment utilizing only that portion of time allotted to it. The net effect, of course, is that no real power is shed.

The general problems associated with all such prior art methods and devices is that while they may accomplish a certain amount of load shedding which benefits the electric utility, they largely ignore a very important factor-the impact of one or more modes of interrupted services on the customer or user. Abrupt or large changes in the environmental temperature of a conditional space are very undesirable from the standpoint of the customer.

Other prior art methods of load shedding include the timed resetting of thermostats to a higher setting in the summer during the air-conditioning season and to a lower setpoint during the heating season for a specified period or number of hours during the peak demand part of the day. This step change does result in a significant energy savings over a long period but yields only a relatively small power reduction at the peak load time. It represents an abrupt change in the temperature of the environment which is sensed by the inhabitants who are required to endure uncomfortable temperatures for this lengthy period of time. What has long been needed is a device which can achieve the required network load shedding with a minimum impact on occupants of the conditioned space.

SUMMARY OF THE INVENTION

By means of the present invention, the ability to control electrical power network peak load is achieved with a minimum impact on the comfort of individuals in the conditioned space, and on the natural diversity of the loads under control. The present invention contemplates a method and apparatus which interrupts and overrides the normal thermostat control in a space conditioning system upon receipt of an external signal, as from the power company, in a manner such that the consumed power does not rise above the level that persisted just prior to the initialization signal. The present invention senses the "natural" or thermostat-controlled cycling pattern of a space conditioning system such as an air conditioner just prior to the start of a load shedding interval. The last cycle is then caused to become the reference or control cycle for the load shedding interval. That is, the ON portion of the reference cycle is caused to become the maximum allowable ON interval and the OFF portion of the reference cycle is caused to become the minimum OFF interval for the entire load shedding interval. In this way the average power consumption is maintained at a level equal to or below the initial or pre-load shedding value.

The tendency to synchronize large numbers of space conditioning devices is also avoided because individual random cycle patterns are maintained. The device may be started by a single radio command or other means. The release from load control may be automatically timed or based on other signals. A radio receiver or other such means is provided to receive the signal from the power utility company which starts the load control function. The utility chooses the extent of load shed and corresponding temperature excursion or rise by its choice of when to start the interval.

Unique features may also be provided to prevent the possible undesirable effects of tampering with the thermostat setpoint just prior to the load shedding interval or to compensate for any cycle pattern of unusually long duration. In one embodiment, this includes the provision of a maximum or default reference duty cycle which becomes the load shedding reference cycle when the reference cycle contains an ON half cycle longer than a maximum value or an OFF half cycle shorter than a given minimum. This can be combined with a "ratchet" system which updates the load shedding duty half-cycles to match the value of the natural or thermostat-controlled cycle whenever the thermostat calls for a shorter ON or longer OFF half cycle than that of the then current reference duty cycle. A second anti-tampering system uses a load shedding reference duty cycle based on the last thermostat-controlled cycle having an ON and OFF half-cycle range of times which do not exceed predetermined maximum and minimum half-cycle times. Half cycles outside the predetermined time range are simply ignored in establishing the reference duty cycle timing. The ratcheting system is normally not used with this load shedding strategy. The entire load shedding operation may be accomplished electronically.

The cycle control device of the invention can be installed in one package, for example, in the outdoor (compressor) unit of a split system whole house air conditioner or at the heating plant. It can be retrofitted at a site with a conventional radio switch (duty cycler) already installed or combined with a radio receiver and installed at any suitable site.

BRIEF DESCRIPTION OF THE DRAWINGS

In the drawing wherein like numerals are utilized to designate like parts throughout the same:

FIGS. 4A through 4H represent the flow chart of the control logic of the duty cycler of the invention;

FIG. 5A is a theoretical plot of "comfort" temperature or conditioned space temperature versus time utilizing a prior art 10, 15, and 20-minute duty cycles per half hour for a 105° maximum temperature day;

FIG. 5B depicts a theoretical plot of cycle average power consumption versus time of day for the duty cycles of FIG. 5A;

FIGS. 5C and 5D are plots similar to 5A and 5B, respectively, for a 90° maximum temperature day;

FIG. 7A is a plot of comfort temperature versus time of day for a 105° maximum temperature day comparing no load control with duty cycling in accordance with the invention with and without a default anti-tampering strategy in a situation having an undersized air conditioning system;

FIG. 7B is a plot of cycle average power consumption versus time of day for the plots of FIG. 7A;

FIGS. 7C and 7D are similar to FIGS. 7A and 7B without a default strategy in the duty cycle control;

FIG. 9A is a plot of comfort temperature versus time of day for a 105° maximum temperature day similar to the plot of FIG. 8A utilizing an alternate anti-tampering strategy; and FIG. 9B is a cycle average power versus time of day plot for the plots of FIG. 9A.

DESCRIPTION OF THE PREFERRED EMBODIMENT

The method and apparatus of the present invention is basically a flexible mode space conditioning load control device which provides a utility company or other controlling entity with the ability to control or limit total power consumption in a power distribution network through a unique duty cycling concept.

The basic concept of the present invention allows an electric power utility to control individual air conditioning or heating loads within a given power network in such a manner that it may accomplish the necessary load shed commensurate with peak power demand of the system with minimum effect on space occupants. Control by the power company will normally be established by a remote signalling system utilizing radio frequency signals or the like.

The system of the present invention is one which senses the cycling patterns of a space conditioning load such as an air conditioner and utilizes this cycling pattern history to control power consumption by its own associated space conditioning device rather than utilizing duty cycling based on a grouping of a large number of such devices within the power distribution network. In the ideal situation, one such device would be associated with each space conditioning load throughout the power distribution network such that the load control interval may be initiated as by a radio signal generated by the utility company when load shedding is required. The duty cycler of the present invention may be installed in the control wiring in series with the existing thermostat. This is normally done at the space conditioner sought to be controlled to eliminate any need for changing wiring in the conditioned space.

As explained in greater detail below, the system has the power to lock out the compressor independent of the thermostat in a load-shedding mode but is arranged so that it can only allow operation of the space conditioner if the thermostat is calling for that operation. In the case of an air conditioning compressor, the system would normally be installed outdoors and control only the compressor leaving the indoor fan to be controlled by the thermostat. However, the duty cycler of the present invention may also be connected in a manner so as to control fan operation also. If the thermostat is calling for cooling, the indoor fan will be on and the system of the invention will command the compressor on and off. If the thermostat is off, i.e. not calling for cooling, the fan will be off also. Of course, if the fan is off, the compressor must also be off to prevent possible evaporator coil damage from frost build-up. While the example of the preferred embodiment is described in relation to the control of electric air conditioning devices, it will be appreciated that the method and apparatus is equally applicable to electric heating systems.

Figure 1:
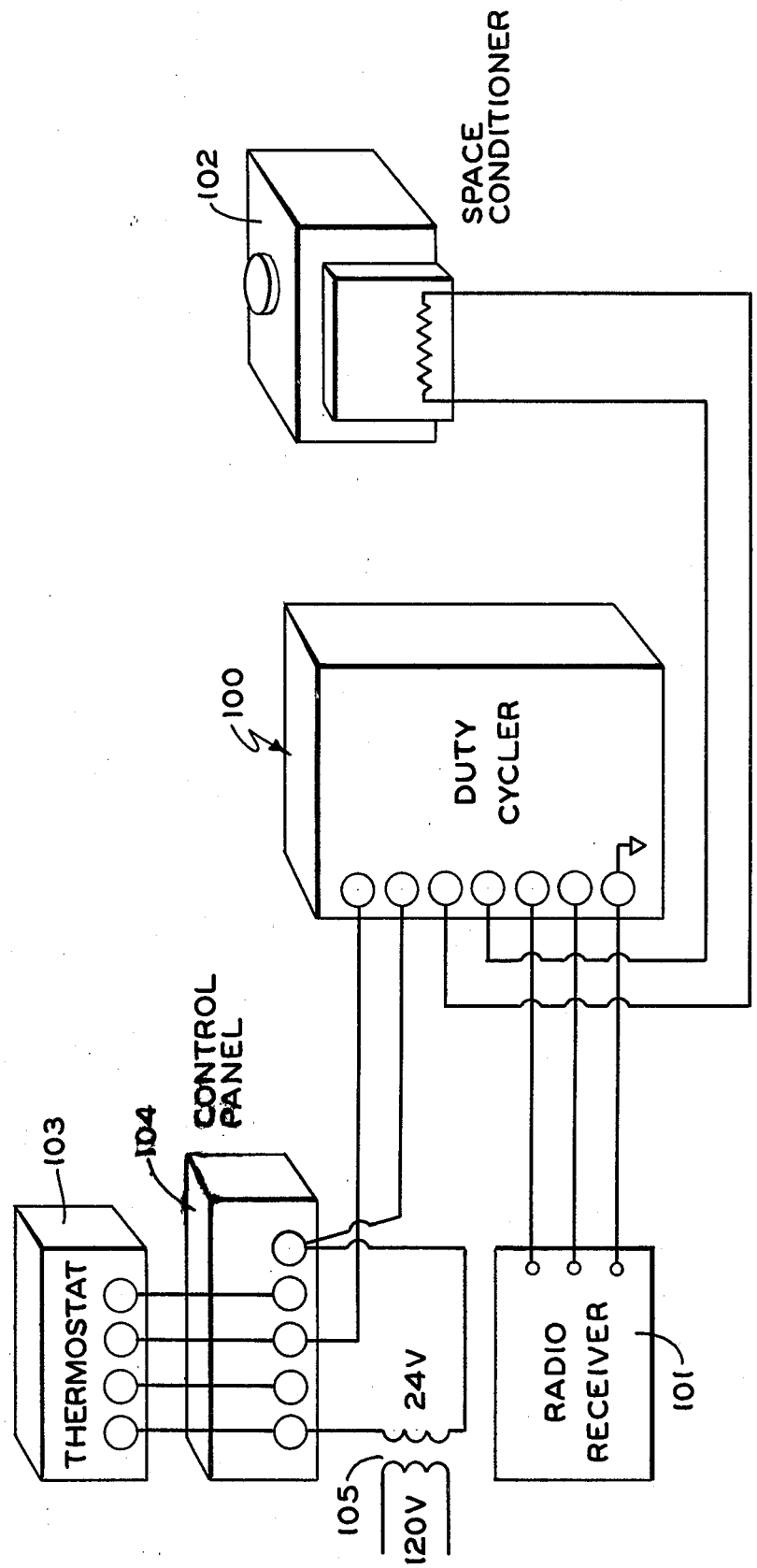
FIG. 1 is the general block diagram of a space conditioning system including the duty cycler control system of the invention.

A block control diagram including the duty cycler of the invention utilized to control the compressor of an air conditioning system is shown in FIG. 1. The system includes the duty cycler of the invention 100 which may operate in conjunction with radio receiver 101 to control space conditioner 102 which may be the compressor unit of a central air conditioning system. Also shown is a normal four-wire heating/cooling thermostat 103 and a wire and control panel 104 which may also exist in the heating/cooling control system. Lower control voltage is provided in highly conventional manner as by a transformer 105. The present invention is concerned with the duty cycler 100 and radio receiver 101. FIG. 1 illustrates how these components fit into a normal heating/cooling system.

Figure 2:
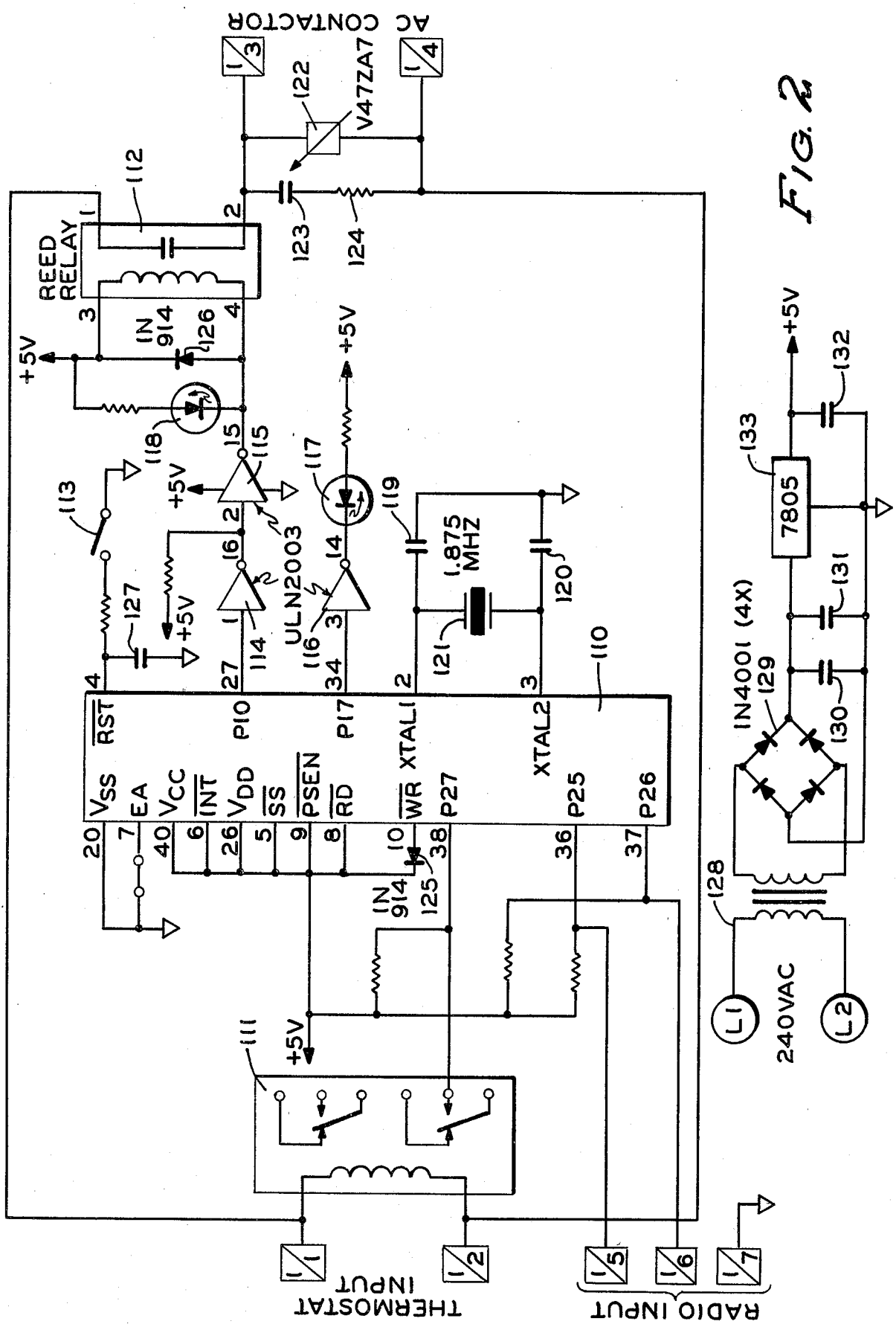
FIG. 2 is an electrical wiring diagram of the duty cycler of FIG. 1.

FIG. 2 is an electrical diagram of an embodiment of the duty cycler in accordance with FIG. 1. In connection with FIG. 2, the boxes designated, for example, 1/1 refer to the terminal board and terminal number connections, respectively. The system includes an 8-bit single chip microprocessor 110 which may be an Intel 8748, relays 111 and 112, and a reset switch 113. Also provided are a signal conditioning driver containing gates 114, 115, and 116, light emitting diodes 117 and 118, and the frequency reference for the microprocessor 110 is provided by crystal oscillator 121 operating in conjunction with capacitors 119 and 120. Noise associated with the air conditioning compressor contactor is controlled and filtered out by means of voltage variable resistor 122 operating in conjunction with capacitor 123 and resistor 124. A diode 125 is associated with the external memory read/write line of the microprocessor 110 and an additional diode 126 is utilized to protect signal conditioning, driver gates 114 and 115. A capacitor 127 associated with the switch 113 is used to generate an internal reset pulse of sufficient length such that all circuitry in the microprocessor 110 is reset when the power is switched ON. Low voltage d.c. is provided to operate the system by a transformer 128 and associated full wave rectifier bridge 129 along with filtering capacitors 130, 131, and 132 and voltage regulator 133.

The microprocessor 110 is an 8-bit, single chip microprocessor which contains a processing element, read only memory, random access memory, internal event timer, and input/output line control. The microprocessor is responsible for monitoring the status of the thermostat, via connector terminals 1 and 2, and the status of the radio commands via connector terminals 5, 6, and 7. The microprocessor 110 contains programming which controls the operation of the air conditioning compressor via terminals 3 and 4 based on the thermostat and radio status. A typical program is included as Appendix A. The relay 111 is used to isolate the microprocessor 110 from the outside world and provides a contact closure output based upon input from the thermostat. Relay 111 is also used to provide the proper current load for the thermostat cooling anticipator in a well known manner. Likewise, the Reed relay 112 is used to isolate the microprocessor control output from the external world and controls the power application at the connector terminals 3 and 4 for the air conditioner compressor contactor.

The signal conditioning driver gates 114 and 115 are utilized to condition the output signal from the microprocessor 110 such that proper logic states and current drive are obtained at the relay 112 and light emitting diode 118. The driver gate 116 provides proper current drive for the light emitting diode 117. The light emitting diode 118 is utilized to indicate whether the air conditioner compressor is on or off. If it is in a lit condition, then the compressor should be operating. The light emitting diode 117 is used to indicate whether the thermostat is requesting that the air conditioner compressor be turned on or not. This request is signaled by the lighting of the light emitting diode 117.

The flow chart of the program logic associated with the operation of the duty cycler of the invention is depicted in FIGS. 3 and 4A-H. In addition to normal control, the flow charts depict two alternative anti-tampering strategies associated with the duty cycling in accordance with the present invention. These are denoted Alternate I and Alternate II. These will become apparent in the detailed description of the logic flow charts.

Figure 3:
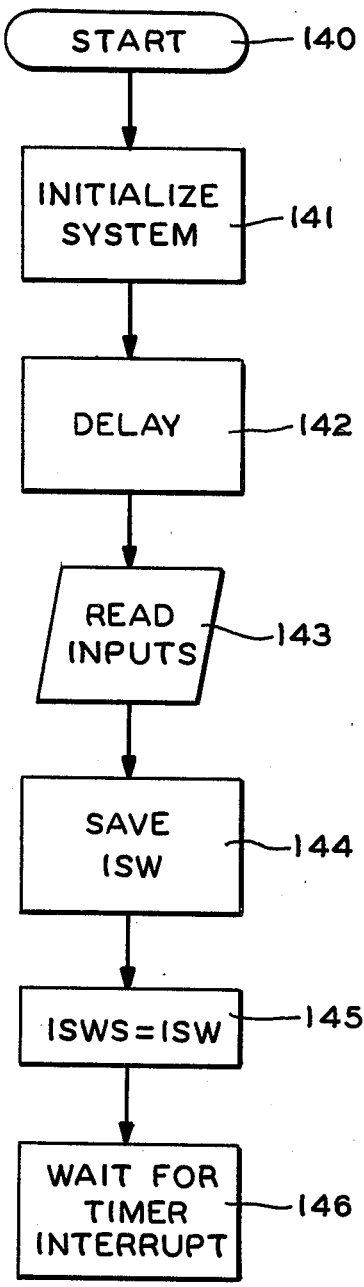
FIG. 3 is a start-up and endless loop logic flow chart for the duty cycler of FIG. 1.

FIG. 3 depicts the initialization or start-up and endless loop routine. As soon as power is available to the system of FIG. 2 the duty cycler microprocessor 110 automatically begins its program at the start 140. The system is first initialized at 141. This basically includes clearing all memory locations, configuring the input/output ports and setting any constants that are required. The constants used in accordance with the invention include the minimum and maximum ON and OFF times the compressor is allowed to have when control is assumed as well as a default ON and OFF time explained below. The next step is a delay 142 which lasts about 30 to 60 seconds and is used to allow the system status to settle before any action is begun. The delay is also useful in staging system start-up, for example, after there has been a significant power failure on the utility power grid network. The inputs to the duty cycler are next read at 143. The thermostat status (ON/OFF) (ISW) is saved at 144 and the previous thermostat status (ISWS) is set equal to the current status at 145. Steps 143–145 preset the thermostat status before actual control begins. The microprocessor then enters an endless loop, designated by 146, while waiting for a timer interrupt.

The 8748 microprocessor 110 used in the duty cycler has a timer which is set to time a fixed interval. When this interval is complete the program is forced out of the endless loop and the interrupt service routine is executed as shown beginning at 150 in FIG. 4A.

Upon receipt of a timer interrupt the inputs to the duty cycler are read at 151. These inputs are the thermostat status and the status of two remote control radio signals. The thermostat status (ISW) is saved at 152. The status of the radio signals is re-checked. If neither radio signal is present (153,154), control of the space conditioning device is in the "normal" mode, i.e. under control of the thermostat only and a flag which indicates the same is cleared (ISHED 20) at 155. If RADIO 1 signal is present and RADIO 2 signal is not present, control is in the load shed mode (ISHED=1) as shown by 156–158. Conversely, if RADIO 2 is present and RADIO 1 is not present, control is also in the normal mode (ISHED=0) via 159–161. If both RADIO 1 and RADIO 2 are present, the signal exits from 157 on line 162 and control is in the Emergency Off mode (ISHED=2) at 163 and the compressor output status is set to zero (ICYC=0) at 164 and the compressor is turned off.

Figure 4A:
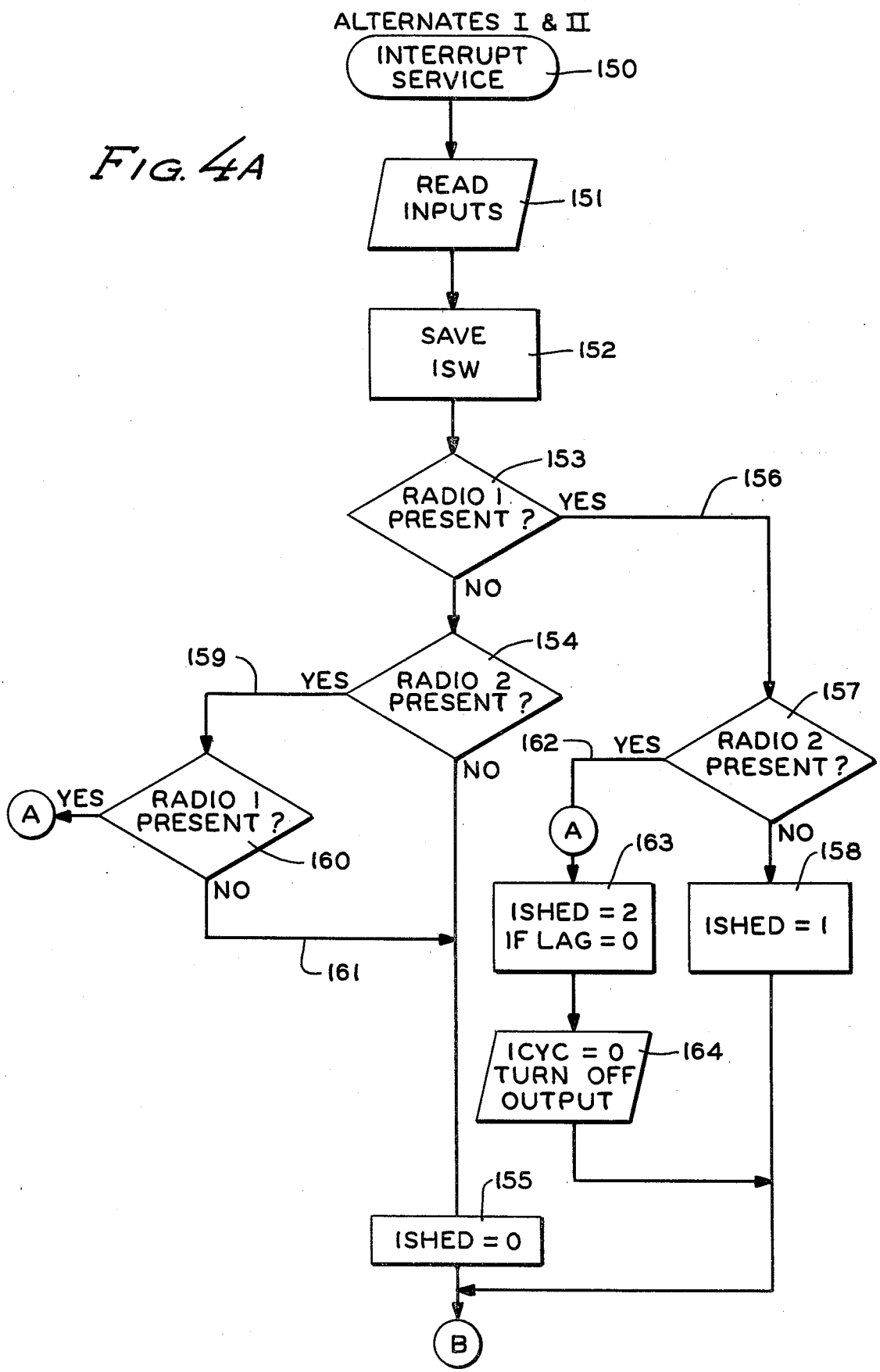
Figure 4B:
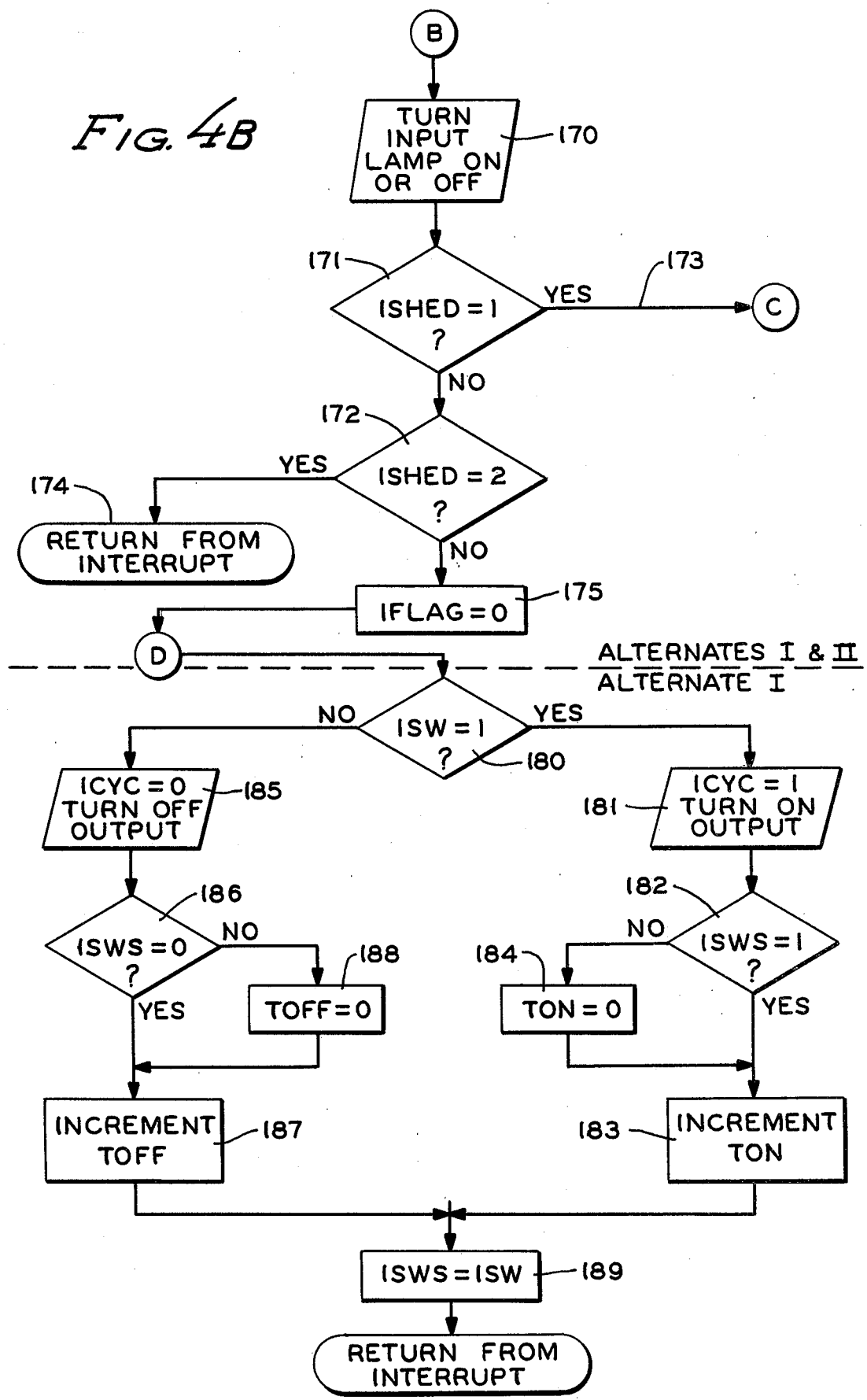

The flow chart continues in FIG. 4B. The thermostat status (ISW) that was saved at 152 is again checked and the thermostat status lamp is turned on at 170 if the thermostat is ON (ISW=1), i.e. calling for the space conditioning load, and turned off if the thermostat is off (ISW=0). The value of ISHED is checked at 171 and 172. If ISHED=1, the load shed mode is in force and program control is transferred to another section of the program under letter C via 173. If ISHED=2, again, Emergency Off is in force and the program is returned from the interrupt at 174 back to the endless loop 146 to wait for another timer interrupt. If ISHED=0, normal mode is in effect and flag (IFLAG) used only during load shed is cleared at 175.

Up to this point in the description, the flow has been identical for Alternate I and Alternate II, the two load shed anti-tampering strategies. The remainder of the flow chart concerned with the use of Alternate I will be described, followed by Alternate II. Alternate I is basically a default strategy which employs a predetermined maximum ON/minimum OFF cycle combination which overrides an unusually long ON cycle just prior to load shedding. Alternate II ignores unusual deviations and relies on a previous normal cycle time.

Alternate I continues below the dotted line in FIG. 4B. When in the normal mode (ISHED=0), the thermostat status (ISW) is checked. If the thermostat is ON (ISW=1) at 180, the compressor status (ICYC) is set to 1 at 181 and the compressor turned on under the control of the thermostat. If the last timer cycle thermostat status (ISWS) is also equal to 1 at 182, the "On" timer is incremented at 183. If ISWS=0, then the thermostat has just switched from OFF to ON, so the ON timer must be reset at 184. If the thermostat had been off (ISW=0), a similar sequence occurs to increment the OFF timer via 185–188. The previous timer cycle thermostat status (ISWS) is updated to the current thermostat status (ISW) at 189 and control is returned to the endless loop waiting for the next timer interrupt at 146.

If, however, ISHED=1 at 171, load shedding is ON and control is transferred to letter C at FIG. 4C via 173. The flag (IFLAG) which is used to signal the completeness of the current ON or OFF half cycle is checked at 190. If IFLAG=1, the current half cycle is completed and control is transferred directly to the program at letter E (FIG. 4D) via 191. If IFLAG=0, the current half cycle is not complete and the thermostat status is checked at 192. If ISW=1, the compressor output status is set at ICYC=1 (193) and the compressor is turned on. Similarly, if ISW=0, the compressor is turned off as seen at 194. Also, if ISW=1, the ON timer value is compared to the maximum ON time at 195. If the ON time exceeds the maximum allowable, the ON time is set to the predetermined default ON time, the OFF time is also set to the default and two duty cycle timers TCYC and TSTAR are set to the ON time at 196 such that the duty cycle will be controlled in accordance with the default mode.

If the ON time is less than the maximum or if ISW=0, the current thermostat status (ISW) is compared to the previous cycle's status (ISWS) at 197. If they are equal, this indicates that a switching event has not occurred and control is returned to letter D (FIG. 4B) where the ON and OFF timing sequences is followed. If ISW does not equal ISWS, this indicates that the thermostat has switched from ON to OFF or OFF to ON and the signal proceeds via 198 to 199 where the OFF time is checked to see if it is greater than the maximum allowable OFF time. If it is, the default duty cycle times are substituted for the measured ON time and OFF time at 200. The duty cycle timers TCYC and TSTAR are cleared at 201. In either case, because a half cycle has just been completed, IFLAG is set to 1 at 202 to signal establishment of the duty cycle pattern. In addition, the previous thermostat status (ISWS) is set to the current thermostat status (ISW) and a temporary thermostat status (ISWP) is also set to the current thermostat status.

Figure 4D:
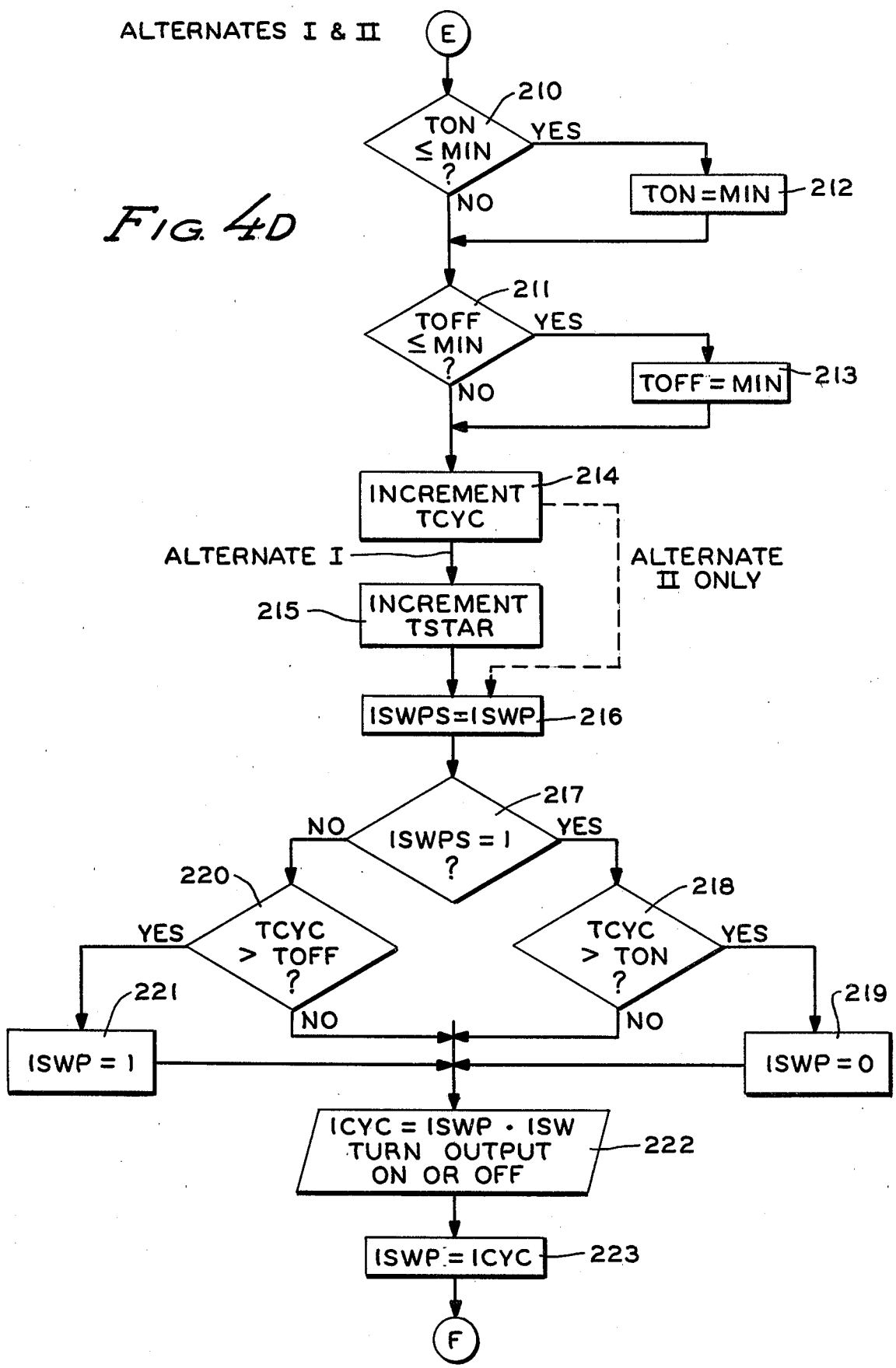
Figure 4E:
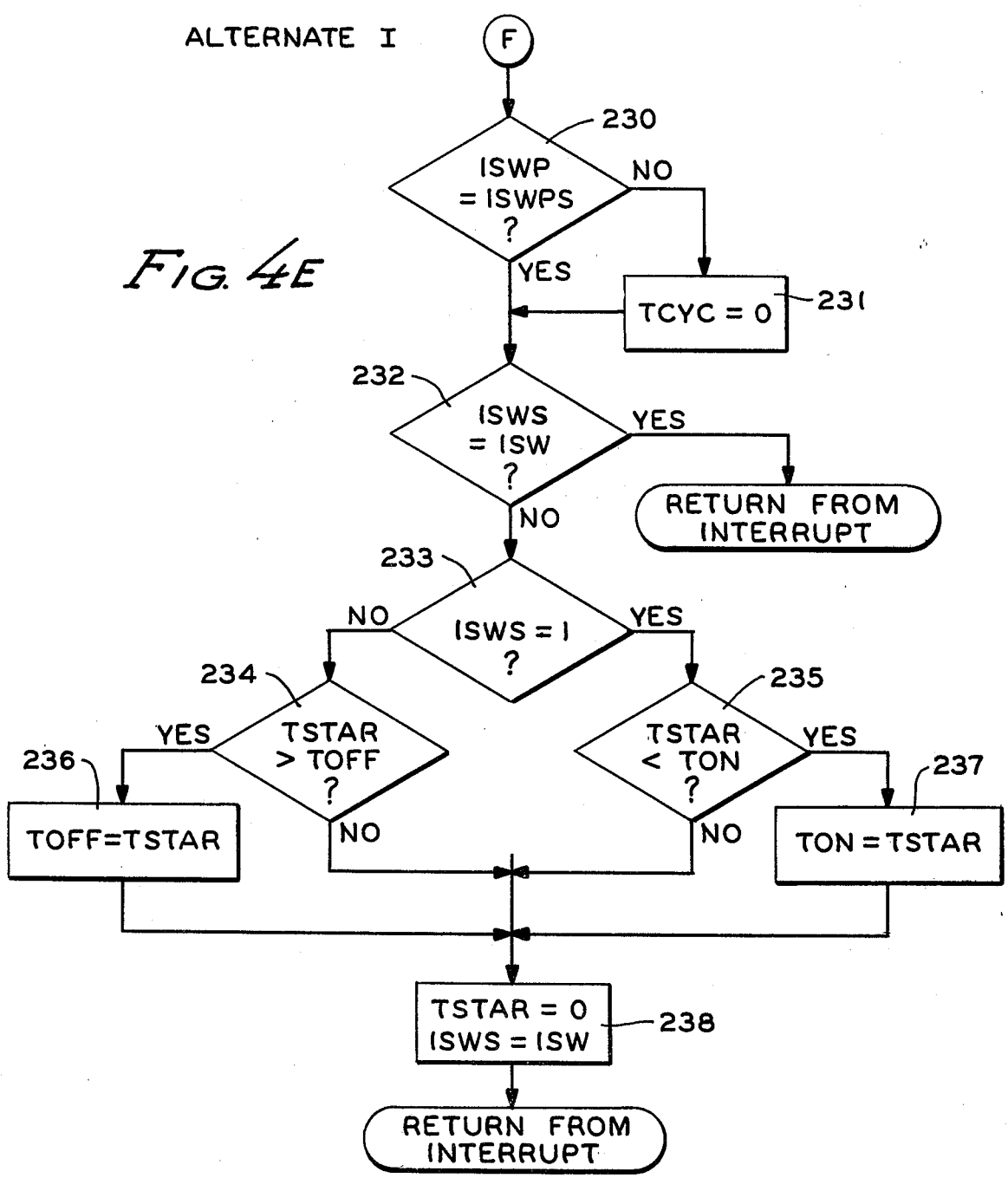

The sequence then proceeds to letter E at FIG. 4D where the ON and OFF times are checked against the minimum ON and OFF time at 210 and 211. These times are set to the minimum at 212 and 213, respectively, if they are less than or equal to the minimum. TCYC is incremented at 214. The timer TCYC is used to time the current ON or OFF compressor interval during operation in the duty cycle mode. TSTAR is then incremented at 215. The TSTAR timer is used to time the ON or OFF interval of the thermostat during duty cycling to determine if there is a thermostat call for a longer OFF or shorter ON than the then controlling duty cycle times.

Another temporary status word (ISWPS) is set to ISWP at 216. ISWP represents the compressor output status of the duty cycler. If ISWPS=1 (217), the duty cycler is timing an ON period and TCYC is then compared to the ON timer at 216 to see if the allowable ON cycle has been completed. If TCYC is greater than the ON time, the ON period has been completed and ISWP is set to 0 at 219. Similar logic is followed for an OFF cycle period via 220 and 221 if ISWP=0. The new value of ISWP is ANDed with the thermostat status (ISW) to establish a new compressor output status (ICYC) at 222. This is done so that if the thermostat is not calling for space conditioning (ISW=0) at 223, the compressor must also turn off regardless of the value of ISWP. ISWP is set to ICYC at 223 and then checked against ISWPS (FIG. 4E) at 230 which, of course, was the old ISWP value. If ISWP and ISWPS were not equal (i.e. the compressor has changed from ON to OFF or OFF to ON), TCYC is reset at 231.

Under G, the current thermostat status (ISW) is then compared with the previous status (ISWS) at 232. If they are the same, no thermostat status change has occurred so control is returned from the interrupt back to the endless loop at 146. If the thermostat status has changed (233), TSTAR, which is the thermostat ON or OFF time during duty cycle, is compared to the ON or OFF reference time at 234 and 235. If a longer OFF or shorter ON has occurred, the ON or OFF reference times are updated at 236 and 237, respectively. TSTAR is then reset and the previous thermostat status (ISWS) is set to the current status (ISW) at 238 and control returns from the interrupt service routine back to the endless loop of FIG. 3 at 146 waiting for another timer interrupt.

Alternate II represents another strategy for defeating tampering in accordance with the present invention. Whereas Alternate I as we have seen utilizes a default timing mode to establish the maximum allowable ON and minimum OFF periods if a long ON period is sensed, Alternate II does not. Alternate II continues in FIG. 4F with the letter D sequence.

When in the normal mode (ISHED=0, from FIG. 4B), the thermostat status (ISW) is checked beginning at 240. If the thermostat is ON (ISW=1), the compressor status (ICYC) is set equal to 1 at 241 and the compressor turned on under the control of the thermostat. If the last timer cycle thermostat status (ISWS) is also equal to 1 at 242 indicating the continuation of an ON cycle, the timer is incremented at 243. If ISWS=0, the thermostat has just switched from OFF to ON, so the ON timer is reset at 244. Also, if ISWS=0 at 242, the OFF time is then compared to the predetermined maximum allowable OFF time at 245. If the OFF time is less than the maximum, the reference OFF time (TOFFOLD) is set to equal the OFF time at 246. If, however, the OFF time is less than the minimum (247), the reference OFF time is set to the minimum at 248. Returning to 240, if the thermostat is in the OFF mode (ISW=0), a similar sequence occurs to increment or rest the OFF timer. This is accomplished through the steps 249-256 as indicated. The previous timer cycle thermostat status (ISWS) is then updated to the current thermostat status (ISW) at 257 and control is returned to the endless loop of FIG. 3 waiting for the next timer interrupt. In this manner, the OFF and ON times or half cycles of the natural cycle are updated.

Figure 4G:
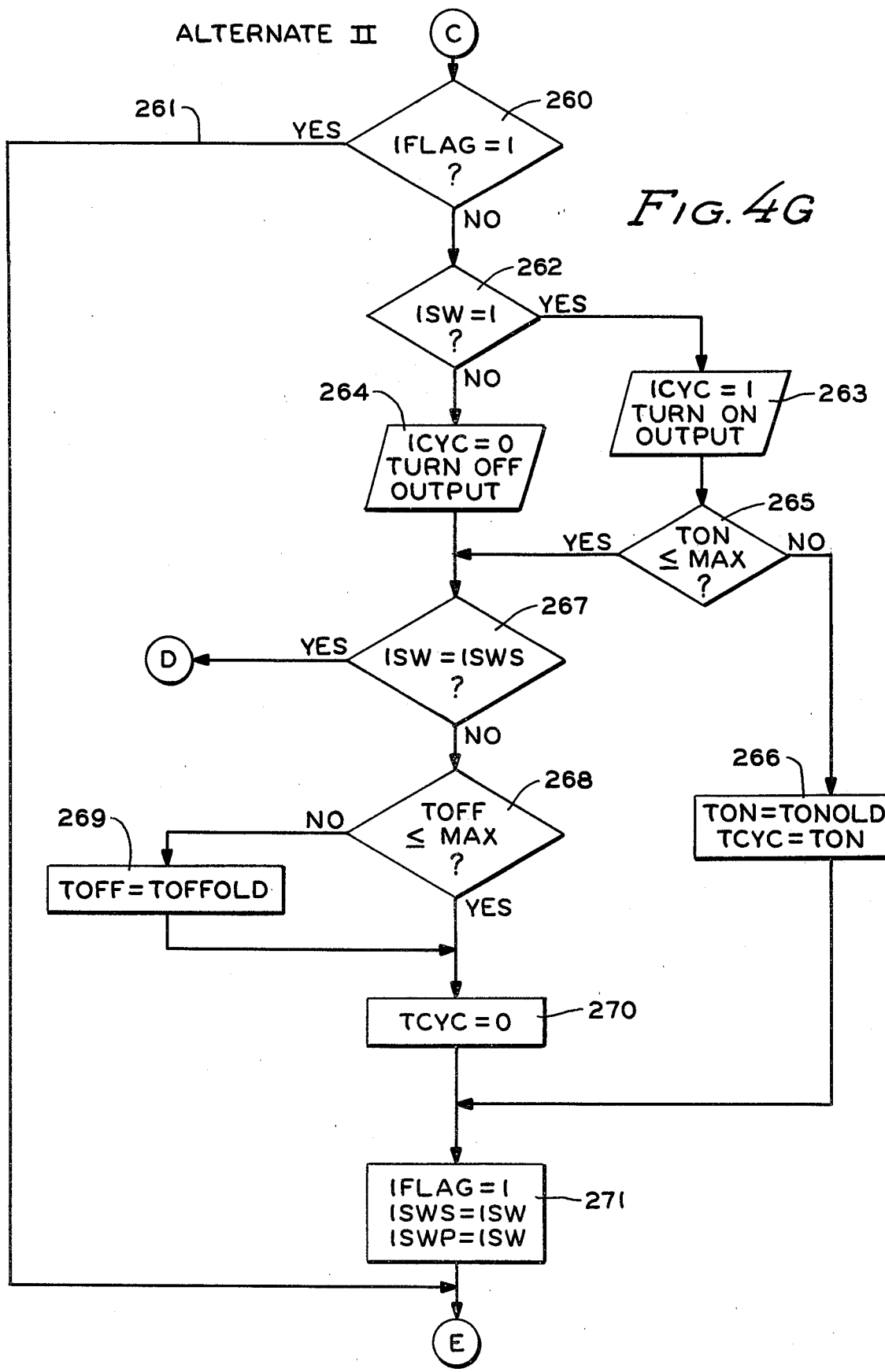

Of course, if ISHED=1 (FIG. 4B), control was transferred to the load shedding control under letter C which, for Alternate II, is found in FIG. 4G. The flag (IFLAG) which again is used to signal the completeness of the current half cycle is checked. If IFLAG=1, the current half cycle is complete and control is transferred to the program at letter E as indicated by 260 and 261. If IFLAG=0, the current half cycle is not complete and the thermostat status is checked. If ISW=1, at 262, the compressor output status is set (ICYC=1) and the compressor turned on or allowed to continue to run at (263). Similarly, at 264, if ISW=0, the compressor or load is turned off or stays off. If ISW did equal 1, the ON timer value is compared to the maximum ON time and if that On time exceeds the maximum, the ON time is set to the reference ON time (TONOLD) and a duty cycle timer TCYC is set to the ON time (265,266).

If, on the other hand, the ON time is less than the maximum or if ISW=0, the current thermostat status (ISW) is compared to the previous cycle's status, ISWS at 267. If they are the same, a switching event has not occurred and control is returned to letter D where ON and OFF timing occurs. If ISW does not equal ISWS, this idicates that the thermostat has switched either from ON to OFF or OFF to ON in status. The OFF time is checked (268) to see if it is greater than the maximum OFF time; and, if it is, the reference OFF time (TOFFOLD) is substituted for the OFF time at 269 and the duty cycle timer TCYC is cleared at 270. At 271, because the half cycle has been completed, IFLAG is set to 1 to signal establishment of the duty cycle pattern. The previous thermostat status (ISWS) is set to the current thermostat status (ISW) and a temporary thermostat status (ISWP) is also set to the current status.

The flow logic then proceeds to letter E (FIG. 4D) where the same sequence is followed as with Alternate I with one exception. TSTAR is not used and the sequence proceeds directly from 214 to 216. The letter F sequence is the same as for Alternate I.

Figure 4H:
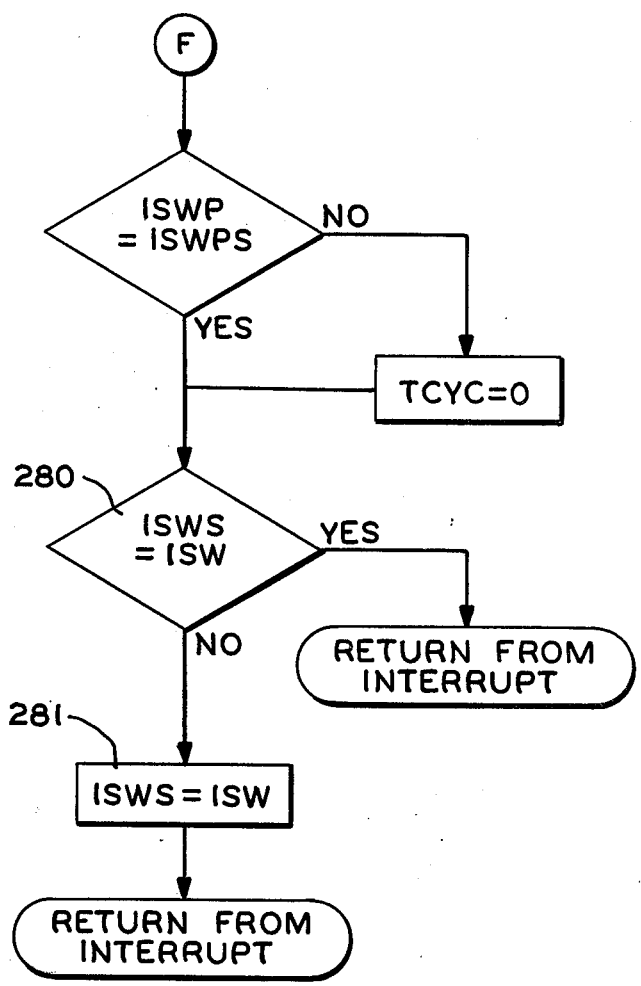

In the final sequence for Alternate II is shown in FIG. 4H, the current thermostat status (ISW) is compared with the previous status (ISWS) at 280. If they are the same, no thermostat status change has occurred so control is returned from the interrupt back to the endless loop as was the case in Alternate I. If, however, the thermostat status has changed, the previous thermostat status (ISWS) is simply set to equal the current status (ISW) at 281 and control is returned from the interrupt service routine back to the endless loop waiting for another timer interrupt.

As can readily be appreciated, from the above, before the load shedding interval begins, the device only monitors the ON and OFF duration of each half cycle of the termostat. The duration is stored and updated at each switching event. During the load shedding interval, the on duration called for by the thermostat is limited by the device to be no longer than the last on period was before the start of the load shedding interval. Each OFF period is extended if necessary to be at least as long as the last natural OFF period was before the start of the load shedding interval. In this way the last ON/OFF cycle or reference cycle is repeated over the entire load control interval.

OPERATION

Before the load shedding interval, the space conditioning plant is cycled naturally under the control of the thermostat with no interference by the duty cycling device of the present invention; that, is the control signal from the thermostat passes through the device unaltered. Immediately upon receipt of the control signal starting the load shedding interval, the duty cycler takes no action but continues to record the duration of the present half cycle up to the next switching event (whether it be ON to OFF or OFF to ON).

From the next switching event time, however, through the remainder of the load shedding interval, the present invention limits the ON cycles and extends the OFf cycles as previously described. This causes the load level to remain essentially constant at the cycle average power consumption existing at the start time. Cycle average power is the average of the power consumed during one complete ON and OFF cycle of the thermostat. The power demand during the ON period is high while the power demand during the OFF segment is low. The average over one complete ON and OFF cycle for a typical building is believed characteristic of the average load over many typical buildings which have their cooling plants cycling randomly with respect to each other.

The device waits to take control until the next switching event for two reasons. Primarily, this allows the utility to start all the devices with one radio command without synchronization (loss of natural diversity) of the air conditioners. This also ensures that the most current cycle becomes the reference cycle for load shedding. With this method, the load shedding is started prior to the expected peak load time while the loads are still rising. The amount of load shed is determined by when the utility sends out the start signal. If it is long before the peak time, the loads will be low and the system will be limited to a low cycle average power. This yields a relatively large load shed relative to the power consumed in an undisturbed system. If the start is nearer the peak time, the load will be limited to a correspondingly higher load level shedding less load relative to the uncontrolled system.

Quite unlike fixed time duty cycling schemes, with the present invention the degree of oversizing or undersizing of the space conditioning equipment is irrelevant. A marginally sized plant will have a long ON time and a short OFF time at the start of load shedding. An oversized system will have a short ON time and a longer OFF time. By measuring the half cycle times then existing and repeating that cycle as the duty cycle over the load shedding interval, this effect is eliminated. Similarly, the present invention is expected to shed the same load on mild heating or cooling days as it does on very severe days.

The automatic adaptation of the load controller to the prevailing ratio of space conditioning machine capacity to the load size at each site accomplished by the duty cycler of the present invention is the essential improvement of the subject invention over prior art (i.e. conventional fixed period duty cycling devices). The impossibility of finding a single ON or OFF time appropriate for all sized air conditioners on all loads and under all weather conditions has been fundamental problem limiting the applicability of conventional duty cycling devices.

In the past the utility company has selected a reasonable duty cycle pattern and applied it universally to all sites. This average duty cycle pattern produces acceptable results in some applications and very unacceptable performance in many others. The present invention in effect by its very nature tailors itself to each application.

As the loads increase from the start time of the load shedding interval the thermostat calls for longer ON times and shorter OFF times. The device intercepts these control signals and prevents the additional power comsumption which would result. Since the power consumption is held constant while the heating or cooling loads rise, the space temperature must change.

Thus, it is not altogether unexpected that in the cooling season, the space temperature rises with cooling load while in the heating season the space temperature falls. The change in space temperature causes the thermostat to lock on. The device of the present invention then has complete control and simply repeats the reference ON and OFF cycling pattern over the load control interval.

If the cooling load again falls below the level which existed at the start of the load shedding, the space temperature will gradually recover with each cycle until the space temperature again reaches the control range of the thermostat. As the required load continues to drop, the thermostat begins cycling naturally calling for less ON time and more OFF time than the reference cycle. As seen from the above discussion, this is allowed by the present invention which is in the nature of an overriding control to prevent the space conditioner from exceeding the reference or pre-load shed amount of power consumption. Thus each space conditioner is released from load control as its load falls below the initialization condition. In addition, it should be noted that no demand overshoot occurs at the end of the load control interval as in the case of conventional duty cycling. There is no tendency to synchronize operation of the space conditioning plants at the end of the load shedding interval unless no amount of recovery has occurred. The control interval used should be long enough to allow the majority of the systems to recover back to within the control range of the thermostat (10-12 hours). When the load control interval has passed, the device reverts to the cycle time monitoring mode which returns full control again to the thermostat. This allows normal cycling to resume. The cycle time monitoring mode continues until the load control signal is once again received by the duty cycler.

Anti-tampering

Any load control strategy causes some reduction in occupant comfort. As a result, some occupants may attempt to defeat the load control strategy while retaining whatever incentive the utility may offer them to have the load control device installed at their home or place of business. Therefore, to be successful, a load control system such as the duty cycler of the present invention must have anti-tampering features as needed to prevent easy defeating of the load control strategy. The basic function of the present invention theoretically could be defeated by an occupant who adjusts the termostat setting just prior to the load control interval to affect an artificially long ON period. This, in turn, produces a reference cycle with a very long ON duration coupled with a short OFF time. If such a reference cycle is used, that space conditioning device could quite possibly cycle naturally (under thermostat control) during the load shed interval without being overridden by the duty cycler of the invention. This, of course, would defeat the load shedding effort.

The start time of the load shed interval is under utility control such that the homeowner never knows precisely when it may begin. Typically, however, load control in a cooling application, for example, is required every afternoon on very hot days at approximately the same time each day. It may be assumed that some people would learn to time thermostat adjustment with the start of the load shed interval. There exist several ways to reduce this problem.

Anti-tampering Alternate I

One is to update the reference cycle after each switching event even during the load shedding interval. As has been seen, this strategy is employed in the logic flow sequence of Alternate I, described above. This special updating of the reference ON and OFF time is accomplished only if the ON time were shorter than the ON time of the reference cycle or saved cycle or if the OFF time be longer than the reference OFF time. Such a cycle would consume less power than the reference cycle does. In this mode of operation, the device of the invention can be considered to operate as a a power "ratchet," that is, the power level can go down during the load shedding interval but not up. The long ON time caused by a step change of the setpoint just prior to the load shedding interval is overridden by the next shorter ON time which follows as the thermostat begins cycling normally after the disturbance. This reduces the effect of and incentive to try to defeat the strategy by setpoint manipulation just prior to the load shedding interval.

Of course, if the setpoint is stepped down so far that the thermostat never causes the compressor to cycle, the compressor may remain ON throughout the entire load shedding interval. This condition may also occur if the air conditioning plant is greatly undersized relative to the load. To prevent this and ensure some load shedding, Alternate I also applies a minimum or default duty cycle strategy such that whenever the thermostat fails to switch OFF for more than some predetermined time after the receipt of the control signal to start load shedding, the default duty cycle overrides the thermostat. The predetermined default cycle consisting of maximum ON and minimum OFF half cycles is chosen to yield some load shed under all conditions but not cause an excessive temperature change at sites with undersized space conditioning equipment. The combination including both the concept of the ratchet mode of cycle updating and the default duty cycling pattern are utilized to overcome tampering strategies and accommodate undersized space conditioning equipment in Alternate I of the present invention.

One possible drawback which exists in the application of the ratchet technique is that it may discourage energy conservation during the load control interval under some conditions. Thus, if the occupants intentionally reduce the load during the load shed or control period, the ratchet mode causes the most reduced load cycle to become the reference cycle. Thereafter, if at some later time during the control interval the load rises again, the comfort conditions may receive a greater impact. In effect, the occupant may be punished for attempting to reduce the load during part of the control interval.

Anti-tampering Strategy Alternate II

The anti-tampering strategy of Alternate II, as previously described, does not involve either the default duty cycle or the ratchet mode of operation. That concept involves updating the reference cycle on a conditional basis at each switching event. In the embodiment including Alternate I, the reference cycle is updated unconditionally with each switching event prior to the load shedding interval. In the embodiment of Alternate II, however, the condition to allow updating of the reference cycle is one in which the ON or OFF duration must not exceed a predetermined maximum length or fall short of a predetermined minimum length. Thus, an unusually long on cycle caused by setpoint manipulation at the beginning of the load shedding interval would simply be ignored by this embodiment. In this way, the reference cycle will be the last cycle within the tolerance limits which occurred before setpoint manipulation. Normally this cycle would be a lower power consuming cycle than any that will follow a setpoint change.

Similarly, if the occupants of the space choose to cause additional load shedding independently outside the load shedding interval, they can do so without penalty. For example, the air conditioning equipment could be shut off for some period of time while the space was unoccupied. This long OFF cycle, if greater than the maximum value, would be ignored and the reference cycle would not be updated to that long OFF period. The shorter previous reference cycle is retained. In the embodiment of Alternate II, the "ratchet" mode of Alternate I is not needed to protect against tampering. Alternate II does not change the reference cycle for any reason during the load control interval. Thus a long OFF period for energy saving during load control has no effect because the reference cycle beings again whenever the space conditioning equipment is needed again.

Also, in the case of an undersized space conditioning plant, the long ON period which could possibly occur at the beginning of the load shedding interval would not be utilized as the reference cycle. Upon receipt of the load shedding command, the device would repeat the last cycle that occurred before the load exceeded the capacity of the space conditioning equipment. This would likely be a cycle with a relatively long ON and short OFF duration. This would automatically yield a relatively mild duty cycle that would affect some load shed without undue comfort temperature excursion. Thus, the Alternate II strategy works without the ratchet mode or the stored default cycle and uses the most recent adaptable cycle for the reference value whenever needed. The only possible disadvantage of this concept is the fact that the reference cycle could be one which occurred perhaps many hours before the onset of load shedding. Thus, the reference cycle would not accurately reflect the load conditions which existed at the initialization time of the load control period.

Minimum Cycle Time Protection

It is well known that short cycling of air conditioning equipment can be damaging to that equipment. The present invention can also be supplied with a minimum half cycle timer which prevents either the ON or the OFF duration from persisting for less than the manufacturer's minimum requirement. Conventional duty cycle devices also may have the drawback that a short ON period of operation is possible. This comes about when the thermostat initiates an ON cycle just prior to the command signal from the duty cycle device to shut off the equipment. Heat generated during start-up of the compressor motor may not be removed through natural functioning of the machine resulting in overheating of the motor windings which, in turn, may result in a shortened useful lifetime.

Power Up Features

The device of the present invention depends on an internal stored memory of a reference cycling pattern. At the initial power-up of the duty cycler, there is no information stored from previous cycles. If the power-up condition occurs during the monitor mode of operation, no problems exist. Each ON and OFF cycle of the thermostat is duly recorded establishing the reference cycle. If, however, following a power failure or for other reasons, the device is powered up and the command signal to shed load occurs simultaneously, the device has no reference cycle with which to begin operation.

Fortunately, any one of several solutions may be employed to overcome this potential dilemma. One method is to automatically load a default reference cycle into the memory at power-up. Another method is to require the device to monitor at least one complete ON and OFF cycle before it can begin a load controlling interval. A third method for the power-up condition when the reference times are not stored within the device is to utilize the minimum ON and OFF feature.

If the initialization strategy after power-up can yield a reference cycle with a longer running period relative to the OFF period, an especially clever occupant may be tempted to utilize this feature as a means to defeat the load shedding strategy. For example, the occupant who notices that the comfort temperature is rising within the conditioned space in the cooling season could conclude that the load shedding is underway. At this point, the occupant could cycle the circuit breaker which controls the air conditioning equipment powering down the load shed device and causing it to power-up during the hold mode. This would give the occupant a more favorable cycling pattern than the one that was recorded at the normal initialization of the load shedding interval. Several options exist to prevent this type of tampering. One is to power the device from a dedicated power line installed by the utility ahead of the power metering equipment at the site. In this way the homeowner does not have access to a switch from which he can power down the device and only actual power outages could affect operation. Another alternative is to provide the device with nonvolatile memory or a volatile memory with preservation circuit such as a battery back-up which will retain the stored half cycle durations throughout short power outages.

FIGS. 5-9 represent theoretical performance plots depicting and comparing the load shedding method of the present invention with that of an uncontrolled system or certain prior art load shedding methods in a manner which reveals both the effect on the conditioned space and the theoretical load shed accomplished by the various methods. The plots, while theoretical were produced using a very sophisticated digital simulation of a 1440 square foot building. The building model was a typical California-style residential home using typical construction for that part of the country. The particular type home was chosen because that part of the country represents one in which load shedding is presently of a primary concern to the power utility companies.

The model chosen represents a house that was built over a crawl space having stuccoed exterior walls and an attic having an uncooled crawl space. Assumptions were made that the walls contained 3½ inches of fiberglass insulation, the roof, 6 inches of fiberglass insulation, and single pane windows were assumed. The absorption of the roof was assumed to be 50 percent. The air conditioning system for the home had 3 tons of nominal cooling capacity.

The outdoor weather conditions on the graphs utilized (105.1° F. or 90° F. days) are based on actual weather data from the weather bureau in Fresno, Calif. in August, 1965.

The other assumptions made were typical for such building construction. The attic crawl space was assumed to be heated indirectly by the solar flux on the roof surface. The distribution ducting was located in the attic crawl space and heat flow from the crawl space into the ducting was simulated. The building had approximately 25 percent of its exterior walls in windows and doors and the solar flux was assumed to penetrate the window openings. Overhanging eaves were modeled around the perimeter of the roof and the resulting shadows affected the solar flux on the walls and windows. A constant infiltration rate of one air change per hour was assumed for the conditioned space and that for the attic crawl space and the floor crawl space were chosen at typical values for natural ventilation of such areas. Radiation heat exchange between the interior wall surfaces and floor and ceilings was also modeled.

In order to more carefully evaluate the value of the dynamic load shedding, much care was taken in assuring correct calculation of the internal thermal mass and the thermal mass of the structure. Each wall surface was broken down into its constituent construction materials and modeled by a separate thermal resistance appropriate to each material. The thermal mass of each layer of each wall was modeled by a thermal capacitance and a differential equation according to the thermal capacitance was written for each thermal mass in the structure. These differential equations represent the storage of energy within the structure and content of the building. Approximately 25 ordinary, linear differential equations were required to simulate the building modeled.

The air conditioning plant was a Lennox 3 ton central air conditioning system with a separate outdoor condensor and indoor evaporator. The model of the air conditioner was a non-linear curve of the performance data available from the manufacturer's literature. Thus, the power required for the cooling capacity varied with indoor and outdoor air temperature conditions and the capacity of the air conditioner for latent cooling was also simulated thereby accounting for the effect of moisture build-up within the conditioned space.

The thermostat utilized was modeled in a manner which included all internal dynamics. The thermostat model required two ordinary differential equations to simulate its behavior. In the model of the building, the thermostat as well as the air conditioning plant were combined to form a complete system of differential equations. In this manner, the complete interactions of the building, control system, air conditioning plant, and the outdoor weather conditions were properly modeled.

Such techniques have been used by the assignee of the present invention successfully in designing other control systems and in simulating other model conditions.

An important conventional method of load shedding which has been utilized and contemplated by electric power utilities involves the concept of fixed-interval duty cycling. FIG. 5A is a plot of "comfort" temperature versus time of day for the duty cycling concept utilizing three different time duty cycles.

As used in the plots and discussion herein, "comfort" temperature is defined to be a weighted average of the indoor dry-bulb temperature (½) and the radiation temperature of the four walls, floor, and ceiling in the conditioned space (1/12 each). The three typical duty cycle strategies shown in FIG. 5A include 10, 15, and 20-minute duty cycles per half hour which denote the amount of time for each one-half hour that the power is shut off to the air conditioning compressor or the interval that the compressor is locked out by the duty cycle. The typical sawtooth waveform is the normal variation in comfort temperature as the cooling plant cycles ON and OFF on thermostat command about the setpoint line (solid curve).

Clearly, both the 20-minute and 15-minute duty cycle strategies (dashed curves) allow the indoor comfort temperature to rise significantly. If the air conditioning compressor in this example had been undersized, the upward excursion of the air temperature would have been even greater.

This illustrates a fundamental problem with fixed-interval duty cycling which is the lack of comfort temperature control of any kind during the load shedding interval. FIG. 5C is a plot similar to 5A for a 90° day.

FIG. 5B is a theoretical plot of cycle average power versus time of day. The "cycle average power" is defined as the average power consumed by the system during one complete ON and OFF cycle. The cycle average power is typically much less than an instantaneous power demand as upon start-up of the air conditioning compressor. While the net air conditioning power demand on the utility is made up of the sum of the instantaneous power demands from all the air conditioning units in a given service area, the cycle average power for a typical building is believed to be representative of the ensemble average power consumed by a large number of buildings. If the load shedding device does not disturb the natural diversity, the cycle average power, then, is a good measure of the average power demand per building in a given service area. If the natural diversity is destroyed, as in some of the examples herein, however, all the cooling plants will be operating at one time which results in a great deal more power than the cycle average power being drawn which could be disastrous.

FIG. 5B depicts the cycle average power versus time of day for the 10, 15, and 20-minute duty cycling concepts of FIG. 5A. As expected by the great degree of temperature overrun in the 15 and 20-minute duty cycling, a great deal of load is actually shed during the peak demand interval and it increases dramatically as the length of the duty cycle is increased. However, the strategy definitely will synchronize the operation of all the air conditioners controlled on a specific duty cycle. To counter this problem, the utilities must start the duty cycling strategy for sub-groupings of the installed duty cycles. Each sub-group is started out of phase with each other group in an attempt to maintain the natural diversity of the control loads. This, of course, requires additional communication channels or additional communication time on a single channel to coordinate all these efforts. Also, as can be seen in FIGS. 5B and 5D, a tremendous amount of energy over a long term is required for recovery at the end of the duty cycling.

The 10 and 15-minute duty cycle strategies as depicted for a 90° day in FIG. 5C do not cause a significant temperature rise in the conditioned space because the cooling loads are much lower and the air conditioning compressor can almost satisfy the cooling load during the allotted running period of the duty cycle. Only the 20-minute strategy causes a significant rise in indoor comfort temperature. In both the example of FIG. 5A and FIG. 5C, it has been assumed that the air conditioning system was properly sized for the peak load on the 105° day.

Of course, were the air conditioning system oversized, the temperature increase would be lower in all cases because of the better ability to recover. The load shed, however, would be greatly reduced or eliminated depending on the degree of oversizing because the oversized system would draw a great deal more power when operating.

On the other hand, if the air conditioning system were undersized, the comfort temperature increase would have been more dramatic in all cases. This is due, of course, to the fact that the duty cycling device does not compensate for the existing ratio of capacity to load. It is an open loop device and as such is completely insensitive to the particular needs of the application.

One of the essential conditions of the load shedding scheme of the present invention which makes it more acceptable is that it adapts its duty cycling pattern to local conditions through the sensing and reproduction of the natural cycle of the thermostat. If a conventional duty cycling strategy could be tailored to each installation, it would perform satisfactorily in both comfort temperature and power control. It would not be practical, however, for utilities to tailor the strategy of each of the thousands of installations necessary in order for significant load shedding to be accomplished in a power network. The present invention does this automatically.

FIG. 5D is a plot of cycle average power versus time of day for the three load shedding strategies of FIG. 5C, i.e. on a 90° day. As can be seen in a comparison of FIGS. 5B and 5D, the duty cycling strategies yield far less load shed on a 90° than on a 105° day. In fact, the 10-minute and 15-minute duty cycling strategy actually increases the demand for power above that for the fixed 76° setpoint comparison plot. Under these conditions, of course, duty cycling is totally unacceptable.

An additional drawback to fixed-interval duty cycling involves the fact that duty cycling devices are typically installed on the outdoor unit of a split system air conditioner and thereby control or cycle the compressor only and not the indoor circulating fan. The existing thermostat retains control of the indoor distribution blower. When the duty cycling strategy causes the indoor air temperature to rise, the thermostat calls for cooling and it turns on the indoor distribution blower. This causes the distribution blower to operate even when the compressor is off which is not the case for thermostatic control alone and therefore there is somewhat of a demand increase over the uncontrolled situation. In fact, in cases were the ducts are located in higher temperature portions of the house such as attic crawl spaces, the indoor space temperature may actually be increased due to heat which leaks into the distribution ducts and is blown into the conditioned space by the blower.

This effect is partially overcome by the present invention because of the typically shorter OFF cycles produced relative to fixed interval duty cycles. This means that the additional heat input from OFF cycle blower operation (which occurs in both cases) does not build up in the conditioned space over as long a time between compressor operating periods. Therefore, the space temperature swings are not as large and uncomfortable to the space occupants.

Figure 6A:
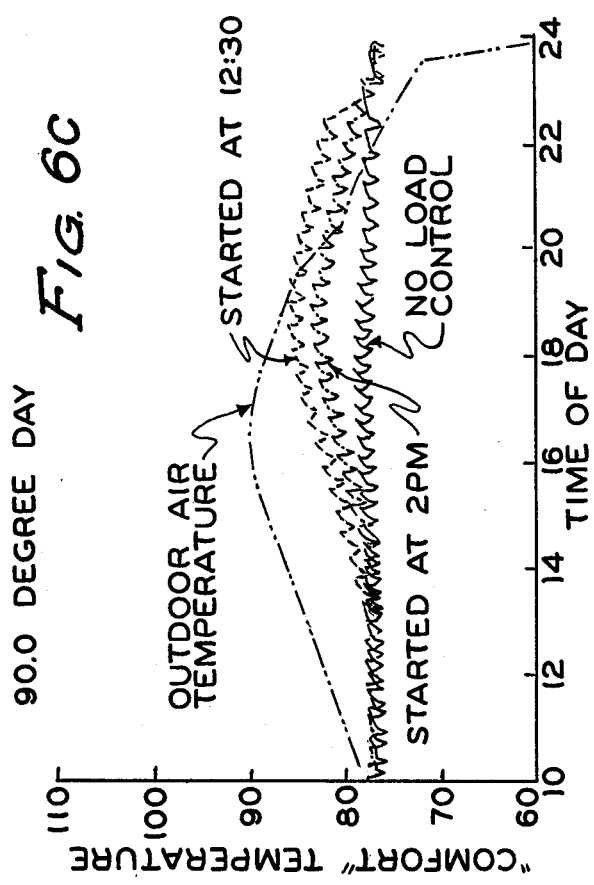
FIG. 6A is a plot of comfort temperature versus time of day for a 105° day comparing no load control with duty cycling in accordance with the invention started at different times.

FIG. 6A is plot of comfort temperature versus time of day for a well-insulated home on a day when the peak outdoor air temperature reached 105° F. The horizontal sawtoothed waveform drawn with a solid line represents the comfort temperature where no load control strategy is utilized. In this example, the setpoint of the thermostat remained at 76° F. The two waveforms which rise above the no load control or baseline case are the comfort temperature waveforms under a load control strategy in accordance with the present invention. The highest of the sawtoothed waveforms drawn in the dashed line pattern having equal interval dashes is the comfort temperature excursion when load control or load shed is initiated at 12:30 p.m. and terminated at 10:30 p.m. The middle sawtooth waveform drawn with the long/short dashed line is the comfort temperature with the device of the present invention started at 2:00 p.m.

When the load control of the present invention is started at 12:30 p.m., it is still relatively early in the afternoon rise of the air conditioning load, and the reference cycle has a relatively short ON period fall and a relatively long OFF period (rise). This causes the indoor air temperature to rise gradually from the thermostat setpoint at 12:30 up to a maximum temperature of approximately 86° F. It should be noted that each ON-OFF cycle of the upper sawtoothed waveform is identical in duration and shape to the reference cycle which began just before the 12:30 initialization point.

The middle sawtoothed wave represents a situation in which the load control of the present invention is initiated at 2:00 p.m. In this case, the air conditioning load has already increased such that ON-OFF cycle somewhat longer ON period than OFF period characteristic of that increased load existing later in the afternoon. The additional running time per cycle reduces the upward excursion in temperature. Typically, the loads rise all afternoon until approximately 6:00 p.m. and during this interval the temperature waveforms rise slightly higher each cycle. The temperature drops or recovers, as the air conditioning load drops off again dramatically after the solar load is reduced. It should be noted also that the temperature for the 2:00 p.m. start time recovers back within the control range of the thermostat by shortly after 8:00 p.m. while the plot for the 12:30 start time has not completely recovered by 10:00 p.m. This produces a long ON period beginning just after 10:00 p.m. until the comfort temperature again has recovered to within the control range. This can be prevented by a longer control interval.

It is important to note that the regular cycling pattern of the air conditioning plant is not interrupted or altered in any way by the start-up of the load shedding scheme of the present invention. This ensures the maintenance of the natural diversity of all the cooling loads under control. Notice the very gradual rise and fall of comfort temperature over the control interval. This gradual rate of rise and fall is expected to go relatively unnoticed by the building occupants yielding a minimum impact on perceived comfort.

Figure 6B:
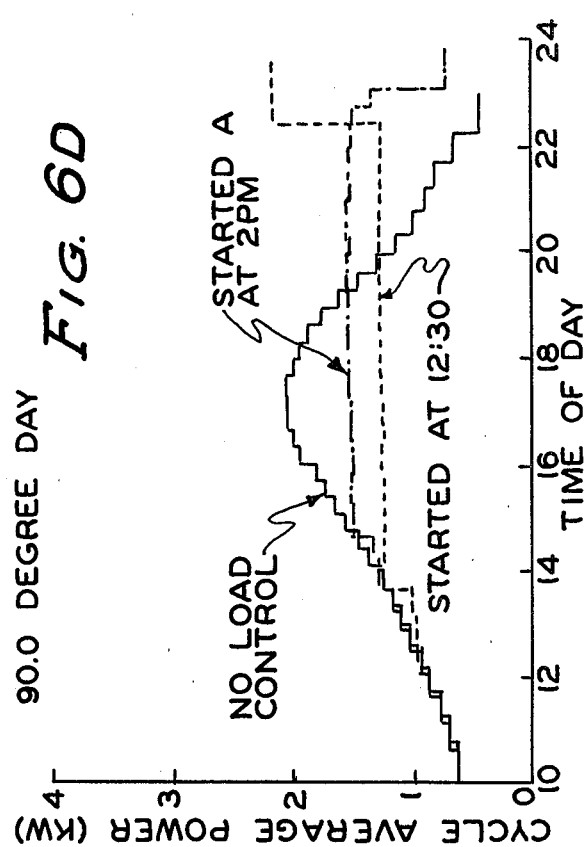
FIG. 6B depicts the cycle average power consumption versus time of day for the plots of FIG. 6A.

FIG. 6B is a plot of cycle average power versus time of day for the same conditions as were utilized in FIG. 6A. The solid black plot represents the baseline or house without load control. Also shown are the cycle average power for the case where the control system of the present invention is initiated at 12:30. In accordance with the system of the present invention, the cycle average power remains constant throughout the load shedding interval. The slight power overshoot that results at the end of the load shedding interval occurs because the temperature has not completely recovered to a point within the control cycling range of the thermostat at the end of the load shedding period. Had the load shedding interval been extended another two hours, the device would have recovered completely and no power overshoot would occur. The cycle average power on the uncontrolled system rises dramatically to a peak at about 4-6 p.m. and falls again after sundown. The difference between the solid curve and the dashed curve is the instantaneous load shed due to operation of the invention.

If the cycler of the invention is not initiated until 2:00 p.m., a higher load level is allowed because the load rises from 12:30 to 2:00 p.m., achieving less load shed relative to the undisturbed situation. Again the load is held constant at the initialization value by the device of the present invention. The 2:00 p.m. start allows recovery back within the control range of the thermostat earlier in the evening yielding a smooth transition from cycle control to free running operation. Of course, the utility can select the amount of load relief required based on initialization time during the rising load period of the early afternoon.

Figure 6C:
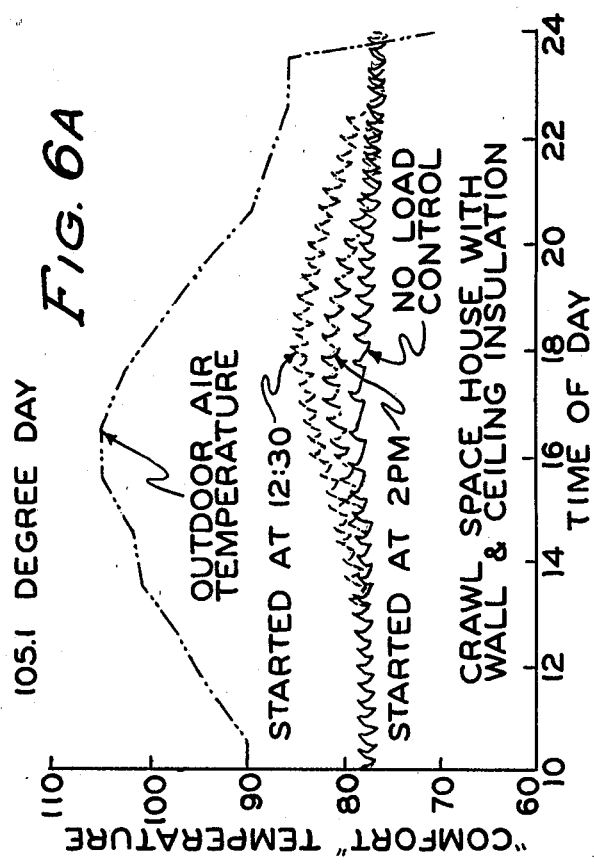
FIGS. 6C and 6D are similar to FIGS. 6A and 6B for a 90° maximum temperature day.

FIG. 6C is a plot of comfort temperature versus time of day for the same building and cooling plant as that of FIGS. 6A and 6B on a 90° F. maximum temperature day. On the 90° day the cooling load is significantly less as evidenced by the characteristic shorter ON periods and longer OFF periods which can be seen on the comparison of uncontrolled solid plots on 6A and 6C.

The reference cycle selected in accordance with the invention involves significantly longer OFF periods and shorter ON periods on the milder day. This automatic adaptation of the reference cycle caused the indoor air temperature to rise approximately the same amount in this example as it did on the 105° day. Because the cooling load does not rise and fall as sharply on the 90° day as on the 105° day, it requires more time to recover from the highest temperature condition back to within the control range of the thermostat. In fact, the indoor air temperature is still 5° to 6° above the control range at the arbitrary end of the control interval which produces a long running period after control is ended at 10:30 p.m.

Figure 6D:
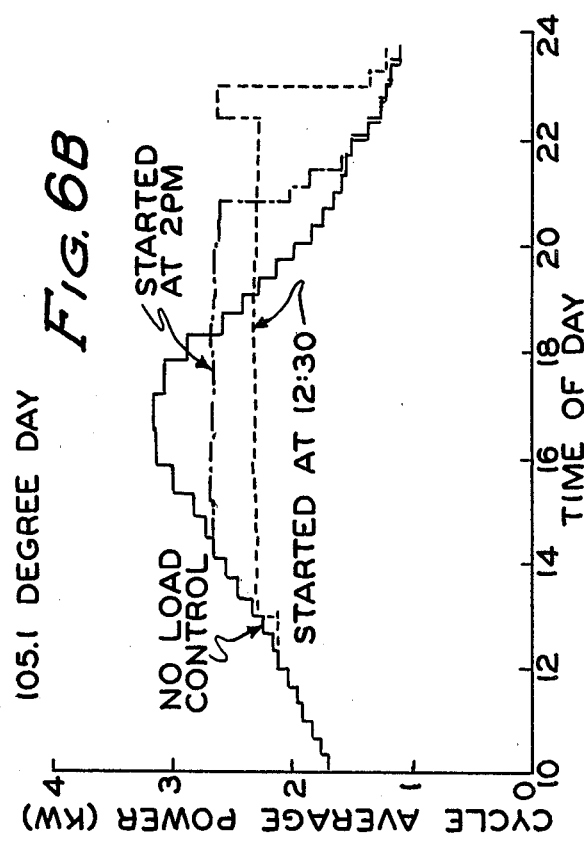

FIG. 6D is the plot of cycle average power versus time of day corresponding to 90° day data of FIG. 6C. The nomenclature for this figure is the same as for FIG. 6B. Although the uncontrolled or baseline cycle average power is much lower on the 90° day then was the case on the 105° day, the apparent load shed is approximately the same magnitude at each time during the load shedding interval. From the above, it can be seen that the strategy of the present invention successfully adapts the duty cycle intervals to yield about the same load shed under different conditions of use. None of the undesirable power overshoot which resulted from operational of the conventional duty cycling device on the 90° day as shown in FIG. 5D is apparent on these figures.

The abrupt jump of approximately 0.2 kilowatts to the steady level which is maintained to the end of the load shedding interval evident just after the start of load shedding in some of the plots is due to the thermostat locking in the ON mode when the comfort temperature exceeds the setpoint, forcing the distribution blower to operate continuously. The power required for the blower during the OFF cycles results in the increase in average power consumed. Under higher load conditions of the 105° F. day, the thermostat locks in the ON position more quickly so the effect is less noticeable than it is on the 90° F. day.

The time required to recover from the temperature excursion of the afternoon load shedding interval can be reduced if it is permissible to increase the power consumption during the late evening hours. This is often the case with utilities whose peak loads are caused by afternoon air conditioning requirements. Under these conditions the reference half-cycles can be adjusted to gradually increase the allowed ON time and decrease the required OFF time to speed the recovery from the maximum temperature excursion. This incremental change in reference cycle can be initiated by utility control after the highest period of power demand has passed. Also, for example, the cycle average power could be held constant for any required duration and then "ramped" upward with each new cycle drawing slightly more power than the last until the temperature recovers to a point within the control range of the thermostat at which point the load would fall rapidly to the undisturbed load level.

Of course, conversely, the reference half-cycles can be adjusted gradually to decrease the reference ON half-cycle and increase the reference OFF half-cycle to increase the amount of load shedding during a portion of the controlled period. This would be done when increased load shed is required.

In the above examples, the thermostat locks to the ON position early in the load shedding interval and remains locked on until the temperature recovers back to within the control range. The first time that the thermostat switches the space conditioning system OFF could be detected by the device can be used as the signal for release from cycle control and transfer to the cycle monitor mode in preparation for the next control interval such that a utility initiated release command would not be required. This prevents abrupt demand overshoot at the time of release from load control evidenced in some of the examples.

In the previous example, the air conditioner was assumed to be properly sized for the load. The next example in FIG. 7A assumes that the air conditioning plant, nominally sized at 3 tons, is 1 ton undersized for the load. In other respects the conditions for FIG. 7A are identical to those for FIG. 6A. The undisturbed or baseline case in this example shows a steady cycling pattern until approximately noon when the load exceeds the capacity of the cooling plant and the thermostat locks on until almost 10:00 p.m. The indoor air temperature smoothly rises as the cooling load increases and then falls back to within the control range allowing the system to cycle throughout the rest of the evening.

In this example, the cycle control of the present invention is configured with the "ratchet" mode of operation and a cycle maximum default strategy in accordance with the scheme of Alternate I. The last natural thermostat cycle before the long continuous ON period occurs just after 12:30 p.m. This allows a normal start-up without the necessity of invoking the default strategy for the case where the system of the invention is initialized at 12:30 p.m. If load shed is started at 2:00 p.m., however, during the long continuous ON period, preset ON tolerance of 45 minutes is exceeded and the stored cycle maximum default strategy is initiated. The default strategy utilized in this example is a ⅜ hour complete cycle having a ⅛ hour OFF period and a ⅝ hour ON period. Note that the comfort temperature excursion is essentially the same whether the present invention controls from 12:30 based on the last natural thermostat cycle or based on the default strategy started at 2:00 p.m. In both cases the space temperature recovered to within the control range well before the end of the load control interval.

FIG. 7B is a plot of cycle average power versus time of day for the same simulated conditions as appear on FIG. 7A. The uncontrolled power level is the cycle average power of the long continuous ON period coupled with a short OFF period just after the long running time. The instantaneous power does vary slightly over this interval but only average power level is plotted for clarity. When the device is started normally at 12:30 p.m., power consumption is held essentially constant over the entire demand interval. If the device is started at 2:00 p.m., the power consumption remains higher during the time from 12:30 until 2:00 p.m. However, the default strategy sheds essentially the same load as the natural start at 12:30 p.m. for the remainder of the afternoon.

As previously explained, Alternate II does not require implementation of a default strategy. The plot of comfort temperature versus time of day shown in FIG. 7C is analogous to the plot of FIG. 7A except that the Alternate II configuration without the default strategy is utilized. The example of starting the device at 12:30 remains unchanged since it does not require the default strategy in either case. If control is started at 2:00 p.m., however, a different strategy is utilized. The unacceptably long ON cycle which began at approximately 12:30 is simply ignored by the device upon receipt of the control command and cycle control is based on the last acceptable ON-OFF cycle which occurred from noon to approximately 12:30. This stored cycle yields essentially the same load shed as did the default strategy. Clearly under these conditions either technique in accordance with the present invention would be effective. FIG. 7D shows the power required with the alternate (non-default) strategy. The results are virtually identical with those of FIG. 7B. Notice in this case that the load shed by the 12:30 and 2:00 p.m. starts are nearly identical as would be expected as both cases utilize the same reference cycle in this example.

Figure 8C:
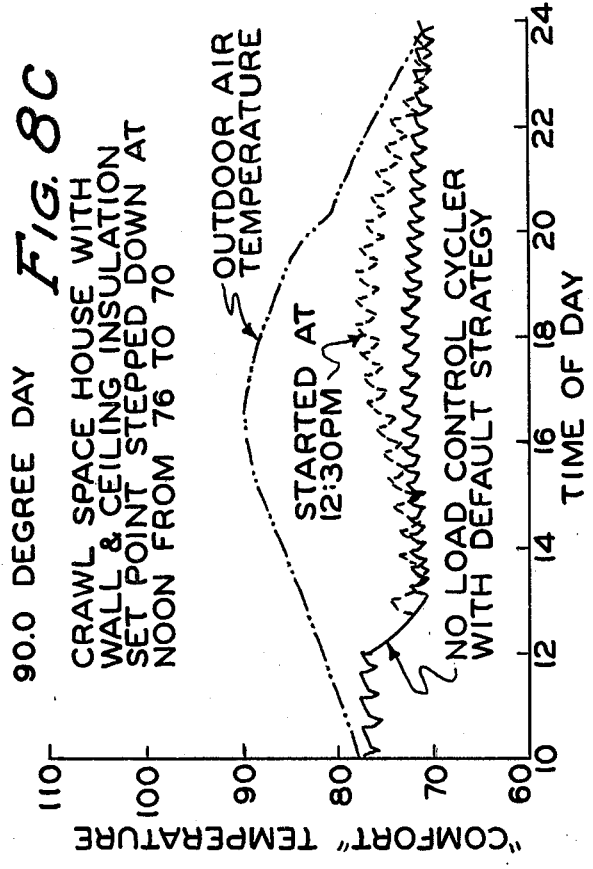
FIGS. 8C and 8D are similar to FIGS. 8A and 8B for a 90° F. maximum temperature day.
Figure 8D:
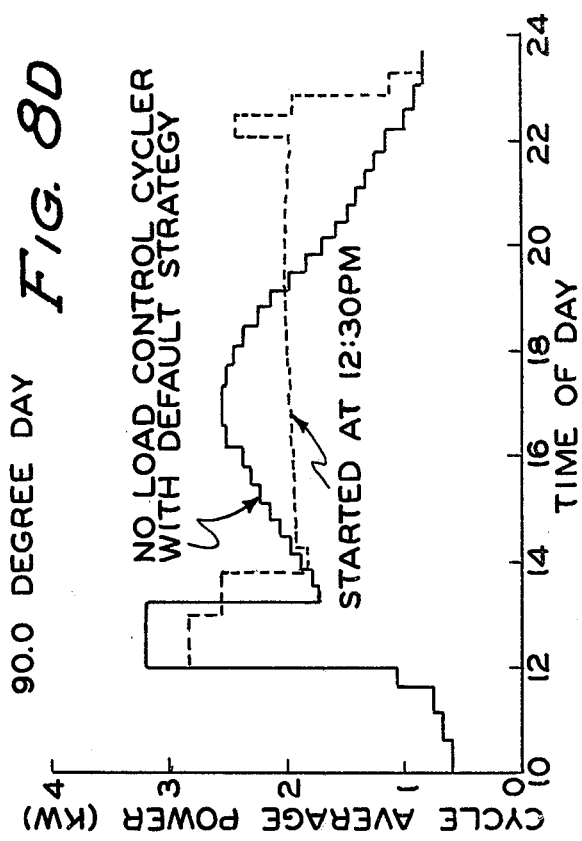
Figure 8A:
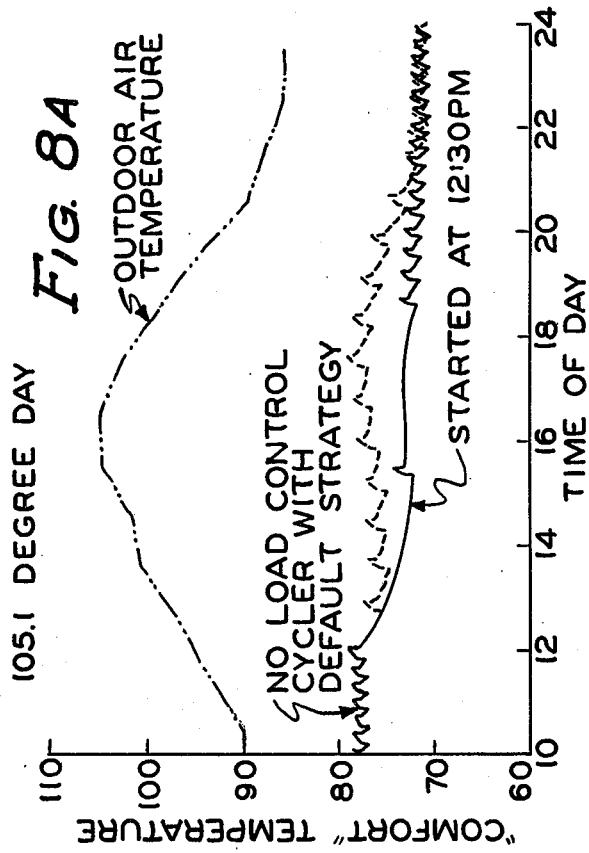
FIG. 8A is a chart of comfort temperature versus time of day for a 105° maximum temperature day in which the consequences of a setpoint adjustment just prior to the initialization of load shedding is compared with the duty cycler of the invention including default strategy.
Figure 8B:
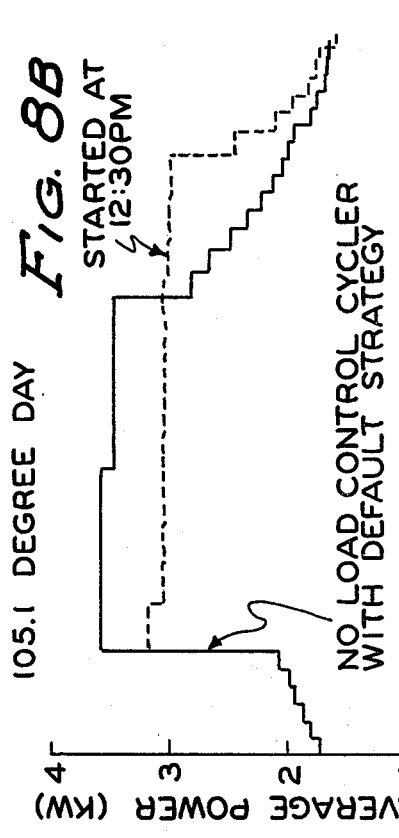
FIG. 8B is the cycle average power consumption versus time of day plot for the plots of FIG. 8A.

FIG. 8A is intended to demonstrate the consequences of a setpoint adjustment or "tampering" just prior to the initialization of the load shedding interval. In this example the setpoint of the thermostat is abruptly stepped down from 76° F. to 70° F. at noon. Because of the increased cooling requirement at the lower indoor temperature, the space conditioning equipment has insufficient capacity to satisfy the cooling load. For this reason only one short OFF cycle occurs all afternoon and the cooling plant runs continuously until approximately 7:00 p.m.

If there were no anti-tampering or default strategy features employed in the system of the present invention, it would simply wait for the next ON-OFF cycle after receipt of the start signal. The next cycle does not occur until approximately 5:30. This reference cycle would have nearly four hours of ON time with a few minutes of OFF time and would allow the cooling plant to operate uninterrupted for the remainder of the evening shedding no load whatsoever. Of course, this would defeat the load shedding strategy. This possibility is not at all unlikely since it is natural for people to set their thermostats down in preparation for the expected discomfort associated with load shedding.

Note that the use of the default strategy clearly causes a rise in space temperature relative to what would have happened without load control. Unfortunately, the space temperature does not rise above the level which would be experienced had the setpoint not been adjusted. Thus, there is no net load shed relative to an undisturbed system. If the default duty cycle strategy were made more severe, i.e. if the default strategy had a shorter ON and longer OFF, it would yield net load shed relative to the untampered system. However, this would be accomplished at the cost of additional discomfort under other conditions. FIG. 8D shows the cycle average power required with no load control but the setpoint stepped down as in FIG. 8A compared to the power required with the default strategy started at 12:30 p.m. A modest load shed occurs relative to the step down of the setpoint situation. However, the load level under control does not represent a net load shed relative to the undisturbed system of FIG. 5A. Therefore, this tampering strategy could be said to have reduced or defeated a load shedding strategy which utilizes the default cycle.

FIG. 8C illustrates the same tampering by setpoint adjustment on a day when the outdoor air temperature reached only 90°. Under these milder conditions, the step down from 76° to 70° requires only a little more than one hour continuous operation of the cooling plant to bring the space temperature to within the control range of the thermostat at the new setting. The device then cycles normally throughout the remainder of the day as the cooling plant has ample capacity to satisfy the loads under these mild cooling conditions. If no anti-tampering strategy were employed and the device were started at 12:30, it would again take the long artificial on period due to the step down as the reference cycle which would allow normal operation with no load shed throughout the remainder of the day. The default strategy does allow sufficient running time to bring the space temperature to within the control range of the thermostat set now at 70°. The system then cycles naturally with a shorter ON and longer OFF than the default strategy. When this occurs, the ratchet mode of operation once again updates the reference cycle so that it now represents the lower power required to main space condition at the new setpoint. With the system forced to repeat this new reference cycle while the cooling loads grow over the afternoon, the space temperature rises and recovers again as was the case in the previous figures.

FIG. 8D shows the cycle average power required in the example of FIG. 8C. The large step in power required on the solid curve is the power required to cool the conditioned space from 76° to 70° after the setpoint is stepped down. The load control device limits this power spike by first starting the default cycle and then utilizing the ratchet mode to hold the power level at the cycle average level that exists at approximately 2:00 p.m. This strategy does shed load relative to the power that would be required to maintain the 70° comfort conditions. However, the dashed curve still requires more power than would have been consumed in the undisturbed system (no setpoint change). Once again the default strategy does not completely satisfy the requirements of a load shedding device.

FIG. 9A shows the comfort temperature under conditions identical to the tampering situation shown in FIG. 8A. Again the setpoint is stepped down from 76° to 70° at noon. In this case, however, the load shedding strategy of the present invention does not employ the default strategy. Instead, it employs a different approach in which the cycling pattern begins immediately after receipt of the start signal based upon the ON and OFF duration from the last free cycle before the setpoint adjustment (at noon) as the reference cycle in accordance with Alternate II. The relatively light loads at noon produce a more severe duty cycle which causes the comfort temperature to reach the same levels as were experienced with load shed in FIG. 6A, the condition without tampering. Temperating by setpoint manipulation is clearly overcome. We expect that with this strategy tampering will not occur. FIG. 9B depicts the power required when the setpoint is stepped down with and without load control in accordance with FIG. 9A. The device of the present invention implemented with Alternate II controls the cycle average power at a very acceptable level that compares favorably to that of FIG. 6B.

The embodiments of the invention in which an exclusive property or right is claimed are defined as follows:

1. A method of limiting the electrical power demand of electrical space conditioning means comprising the steps of:
   sensing the ON and OFF half-cycle times of the thermostat means associated with operation of the space conditioning load means;
   storing information related to said sensed ON and OFF half-cycle times;
   initiating overriding control of the ON-OFF switching function of the space conditioning load means from said thermostat means at the inception of a load-shedding interval;
   controlling the ON-OFF half-cycle times of the space-conditioning load during a load-shedding interval based on load-shed ON and OFF half-cycle times individually determined for that space conditioning load means derived from stored information and in a manner such that the thermostat state determines whether said space conditioning load means is ON during any part of each of said load-shed ON half-cycle times and said space conditioning means remains off during the load-shed OFF half-cycle regardless of thermostat state; and
   returning full control of said ON-OFF switching means of said space conditioning load means to said thermostat means after the load-shedding interval.

2. The method of claim 1 wherein said step of initiating overriding control of the ON-OFF switching function of said space conditioning load means is accomplished in phase with the operation of the space conditioning load means at the inception of load-shedding such that the natural half-cycle at the inception of load-shedding is not disturbed whether the space conditioning means be OFF or ON and wherein the initial load-shed half-cycle at the inception of load-shedding is made to be an ON or OFF half-cycle according to the half-cycle of the space conditioning means then in effect.

3. The method of claim 2 wherein the time of said ON natural half-cycle in effect at the inception of load-shedding is limited in time to the corresponding load-shed ON or OFF half-cycle time.

4. The method of claim 2 wherein said natural half-cycle at the inception of load-shedding is an OFF half-cycle the step of not initiating the first load-shed ON half-cycle before said thermostat means calls for the next natural ON cycle.

5. The method of claim 1 wherein the step of assuming overriding control of the ON-OFF switching means is initiated in response to an externally generated command signal.

6. The method of claim 1 wherein both said steps of assuming overriding control and returning control are responsive to externally generated command signals.

7. The method of either of claims 5 or 6 wherein said command signals are generated by the electric power supplier.

8. The method of claim 7 further comprising the step of signally a plurality of systems in a power network substantially simultaneously to limit power usage in the network.

9. The method of claim 6 wherein said signalling is accomplished by radio frequency communication.

10. The method of claim 8 wherein said signalling is accomplished by radio frequency communication.

11. The method of claim 1 wherein said load-shed ON and OFF half-cycle times are established equal to specific sequential pairs of ON and OFF half-cycle times derived from the sensed past cycling history of said space-conditioning load and contained in said stored information.

12. The method of claim 11 wherein said load-shed ON and OFF half-cycle times are updated in said information storage means at each OFF to ON or ON to OFF switching event of said thermostat prior to the load-shedding interval so that the ON and OFF half-cycle times of the last natural thermostat-controlled cycle of said load prior to the assumption of control at the inception of said load-shedding interval become said load-shed ON and OFF half-cycle times.

13. The method of any of claims 1, 11 or 12 further comprising the steps of:
    comparing the On half-cycle time of said load-shed cycle with predetermined maximum and minimum load-shed ON half-cycle time limits;
    updating said load-shed ON half-cycle time to be within said predetermined ON half-cycle time limits, if the time of said load-shed On half cycle is outside of said limits;
    comparing the OFF half-cycle time of said load-shed cycle with predetermined minimum and maximum load-shed OFF half-cycle time limits;
    updating said load-shed OFF half-cycle time to be within said OFF half-cycle time limits if the time of said load-shed OFF half cycle is outside of said time limits.

14. The method of any of claims 1, 11 or 12 further comprising the steps of:
    setting the time of said load-shed ON half-cycle and said reference OFF half-cycle to equal the last thermostat-controlled ON half-cycle and thermostat-controlled OFF half-cycle sensed prior to the load-shedding interval which falls within predetermined time limits.

15. The method of claim 11 wherein said reference ON and OFF half-cycles for said controlled cycling of said space-conditioning load during the load-shedding interval are established equal to the natural thermostat-controlled ON and OFF half-cycle times of the load conditioning means closest to a selected time of day.

16. The method of claim 11 wherein a plurality of sequential pairs of ON-OFF half-cycle times are stored and a selected pair recalled by the electric power supplier for use as the load-shed ON-OFF half-cycles as communicated by command signals.

17. The method of either of claims 11 or 15 wherein the stored ON and OFF half-cycle times to be used as the load-shed ON and OFF half-cycle times are selected by the electric power supplier and communicated by command signals.

18. The method of claim 17 wherein said command signals are accomplished by radio frequency communication.

19. The method of claim 18 comprising the step of signalling of plurality of systems in a power network substantially simultaneously to limit total power usage in that network.

20. The method of claim 13 wherein said maximum and minimum ON and OFF load-shed half-cycle time limits are under the control of the electric power supplier.

21. The method of claim 14 wherein said maximum and minimum ON and OFF load-shed half-cycle time limits are under the control of the electric power supplier.

22. The method of claim 1 including the step of gradually modifying said load-shed half-cycle ON time and said load-shed half-cycle OFF time at a predetermined rate for a portion of said load-shedding interval to modify the amount of load-shedding.

23. The method of claim 22 including the step of gradually increasing said load-shed ON half-cycle time and gradually decreasing said load-shed OFF cycle time at the end of the load-shedding interval until the thermostat switches to the OFF state again during an ON load-shed half-cycle.

24. The method of either of claims 22 or 23 wherein the modification of said load-shed ON and OFF half-cycle times is under the control of the electric power supplier.

25. The method of claim 24 wherein said power supplier accomplishes said load-shed ON and OFF half-cycle time modification by radio frequency communication with said duty cycling apparatus.

26. The method of claim 1 further comprising the steps of:
    updating said load-shed ON half-cycle to equal the sensed thermostat ON half-cycle time each time the sensed thermostat ON half-cycle is shorter than said load-shed ON half-cycle;
    updating said load-shed OFF half-cycle to equal the sensed thermostat OFF half-cycle time each time the natural OFF half-cycle exceeds said load-shed OFF time limit.

27. A duty cycling apparatus for controlling the electrical power demand of a space conditioning load means comprising:
    timing means for sensing the ON and OFF half-cycle times of the thermostat means associated with the space conditioning load means;
    information storage means for storing information relating to said sensed ON and OFF half-cycle times of said thermostat means associated with said space conditioning load means;
    means for initiating overriding control over the ON-OFF switching means associated with said space conditioning load means overriding said thermostat means at the inception of a load-shedding interval;
    load-shed control means for controlling the ON and OFF half-cycle times of said space conditioning load means during a load-shedding interval based on individually determined load-shed ON and OFF half-cycle times derived from stored information in a manner such that the thermostat state determines whether said space conditioning means is ON during any part of each of said reference ON half-cycle times and said space conditioning means remains OFF during the load-shed OFF half-cycle regardless of thermostat state;

means for returning control over said ON-OFF switching means of said space conditioning load means to said thermostat means after a load-shedding interval; and signal receiving means for receiving externally generated command signals.

28. The apparatus of claim 27 wherein said means for initiating overriding control of the ON-OFF switching function of said space conditioning load means further comprises means to phase in said overriding control such that the natural half-cycle at the inception of load-shedding is not disturbed whether the space conditioning means be OFF or ON and wherein the initial load-shed half-cycle at the inception of load-shedding is made to be an ON or OFF half-cycle according to half-cycle of the space conditioning means then in effect.

29. The apparatus of claim 28 wherein the time of said ON or OFF natural half-cycle in effect at the inception of load-shedding is limited in time to the corresponding load-shed ON or OFF half-cycle time.

30. The apparatus of claim 28 including ON half-cycle delay means in said information storage means initiated if said space conditioning means is OFF at the inception of load-shedding and said load-shed OFF half-cycle has timed out, said delay means preventing the start of the first load-shed ON half-cycle until said thermostat means initially switches to the ON state.

31. The apparatus of claim 27 further comprising means for selecting a particular sequential pair of load-shed ON-OFF cycle times from information stored in said information storage means.

32. The apparatus of claim 31 wherein selection of said particular load-shed ON-OFF cycle times is controlled by externally generated command signals.

33. The apparatus of claim 31 further comprising:
means for comparing said selected load-shed ON-OFF cycle times with predetermined minimum and maximum ON and OFF half-cycle times; and
means for modifying said load-shed ON-OFF half-cycle times as required to be within said maximum and minimum times.

34. The apparatus of claim 27 further comprising:
means for selecting specific sequential pairs of ON-OFF half-cycle times based on external commands from the supplier of electric power;
means for storing said selected pairs of ON-OFF half-cycle times;
means for recalling one of said selected stored pairs for use as the load-shed ON and OFF cycles based on interval commands of the supplier of electric power.

35. The apparatus of claim 27 wherein the load-shed ON or OFF half-cycle is updated in said information storage means with each switching event of the thermostat state prior to the inception of load-shedding.

36. The apparatus of claim 35 wherein timed ON and OFF half-cycles falling outside predetermined maximum/minimum time limits are treated by said information storage means in a manner such that said updating does not occur.

37. The apparatus of claim 27 further comprising means for modifying said load-shed half-cycle ON time and said load-shed OFF half-cycle time to modify the amount of load-shedding during the load-shedding interval.

38. The apparatus of claim 37 wherein said modification is made at a predetermined rate.

39. The apparatus of claim 27 wherein said means for returning control to said thermostat includes means for gradually increasing said load-shed ON half-cycle time and gradually decreasing said load-shed OFF cycle time at the end of the load-shedding interval until the thermostat switches to the OFF state during an ON load-shed half-cycle.

40. The apparatus of any one of claims 37–39 wherein said cycle modification is accomplished by externally generated command signals from the power supplier.

41. The apparatus of claim 39 wherein said means for retaining control is activated after a predetermined time in the absence of a command signal from the power supplier.

42. The apparatus according to claim 27 wherein said signal receiving means is a radio frequency receiver.

43. The apparatus of claim 27 wherein said timer means and said information storage means are contained in a microprocessor.

44. The apparatus of claim 27 wherein said overriding control means further comprises:
electric contactor means in the power supply to the space conditioning load; and
switch means for operating said contactor means in response to said load-shed control means.

45. A non-synchronizing system for power load-shedding in a central power distribution network supplying a plurality of space conditioning means comprising:
separate load-shed duty cycler means connected to each of the space conditioning means participating in load-shedding, said load-shed duty cycler being connected in a manner which allows it to shut off the power supply to said space conditioning means, said load-shed duty cycler means also being connected to the thermostat control associated with the space conditioning means;
signal receiving means associated with said load-shed duty cycler to receiver command control instructions from the power supplier as required for power load-shedding;
load-shed cycle control means in said duty cycler, said load-shed control means including timing means for timing the natural ON and OFF cycle times of said thermostat means, information storage and retrieval means for storing and retrieving information including information supplied by said timing means related to said ON-OFF cycle times and control means for controlling the cycling of said space conditioning based on load-shed ON and OFF cycle times derived from said stored natural cycle time information; and
anti-synchronization means in said load-shed control means including phasing-in means implemented at the inception of the load-shedding interval which causes the initial load-shed ON-OFF cycle to correspond to the natural half-cycle in effect at the inception of load-shedding and wherein said load-shed control means thereafter patterns ON and OFF load-shed half-cycles based on stored information derived from a sequential pair of natural half-cycles contained in said stored information wherein said ON load-shed half-cycle is a permissive ON half-cycle and said OFF load-shed half-cycle is a positive OFF half-cycle to thereby preserve the random natural diversity of the plurality of space conditioning means.

46. A non-synchronizing system for power load-shedding of claim 45 wherein said anti-synchronization means further comprises:
   phasing-out means for gradually increasing the load-shed ON half-cycle time and gradually decreasing the load-shed OFF half-cycle time at the end of the load-shedding interval until the thermostat switches to an OFF state during an ON load-shed half-cycle.

* * * * *